Figure 5:
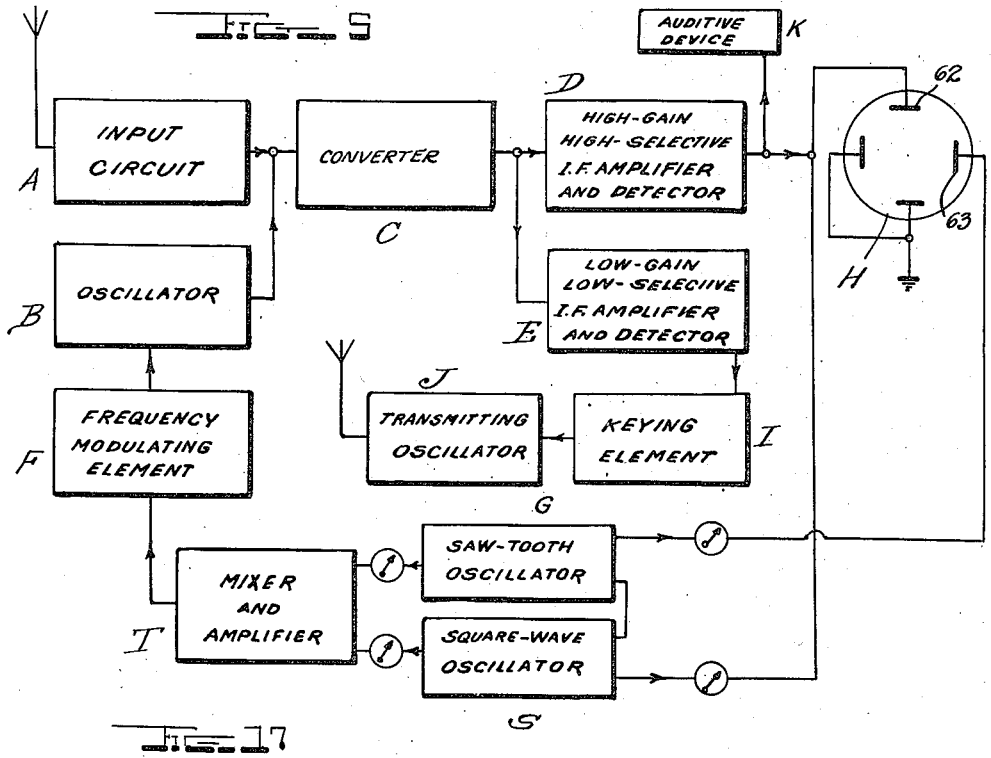

Feb. 23, 1943. M. WALLACE 2,312,203
RADIO BEACON AND PANORAMIC RECEPTION SYSTEM
Filed April 20, 1940 11 Sheets-Sheet 1
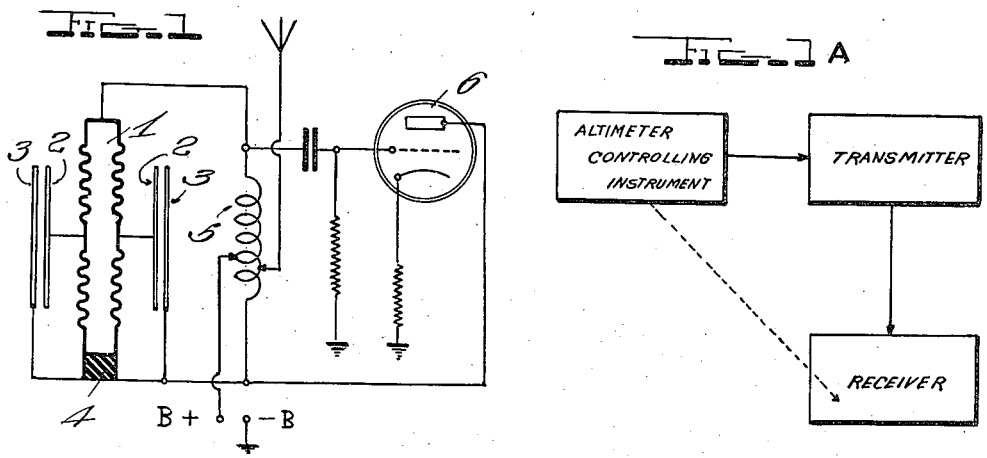
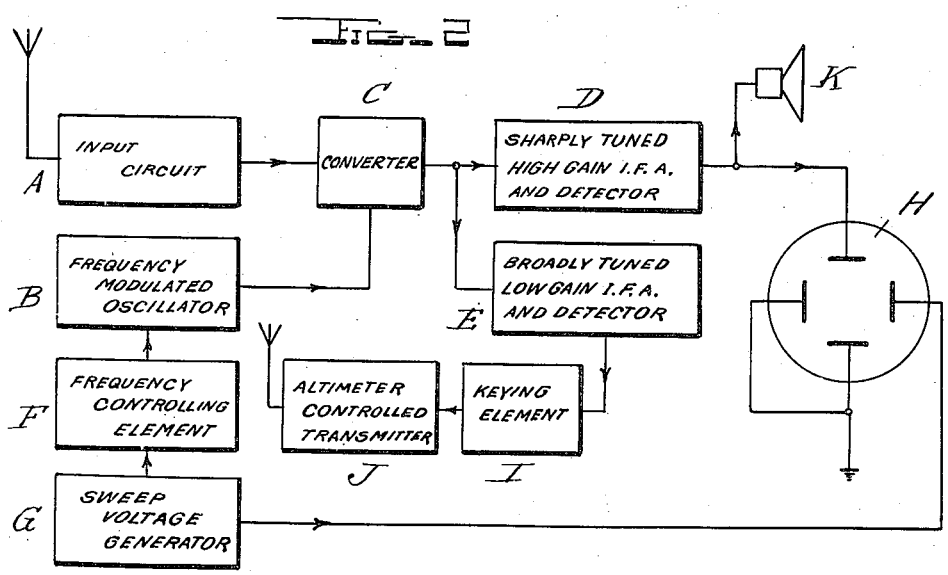
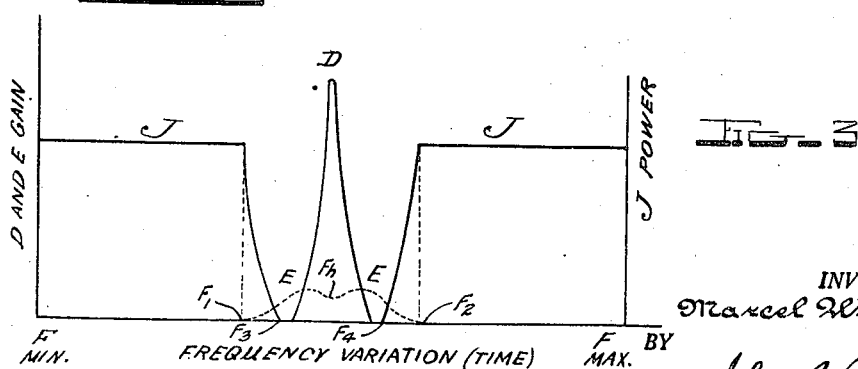
INVENTOR.
Marcel Wallace
BY
John B. Grady
Attorney Feb. 23, 1943.  M. WALLACE  2,312,203
RADIO BEACON AND PANORAMIC RECEPTION SYSTEM
Filed April 20, 1940  11 Sheets-Sheet 2
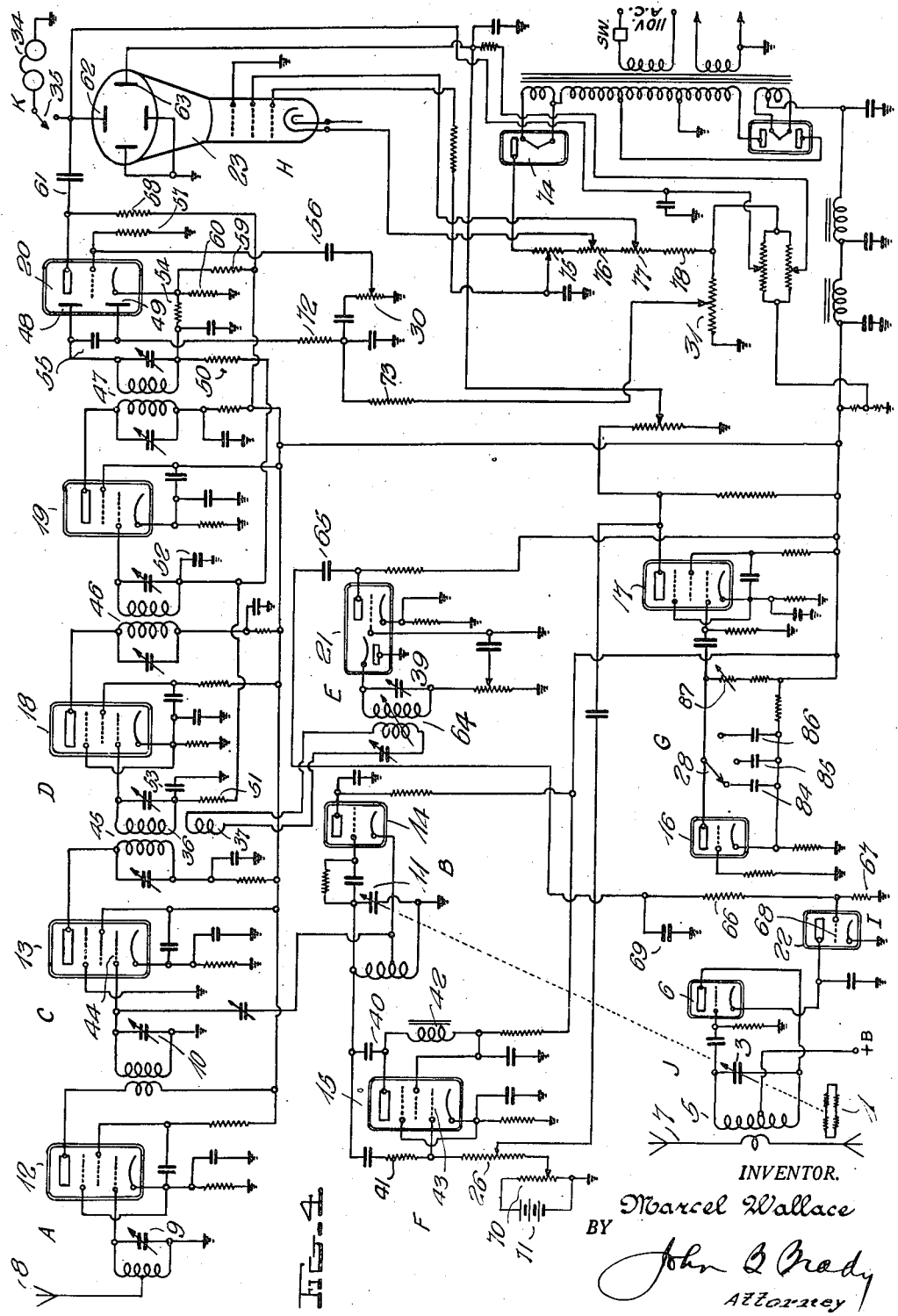
INVENTOR.
Marcel Wallace
BY
John B. Brady
Attorney Feb. 23, 1943.   M. WALLACE   2,312,203
RADIO BEACON AND PANORAMIC RECEPTION SYSTEM
Filed April 20, 1940    11 Sheets-Sheet 3

INVENTOR.
Marcel Wallace,
BY
John Q. Brady
Attorney

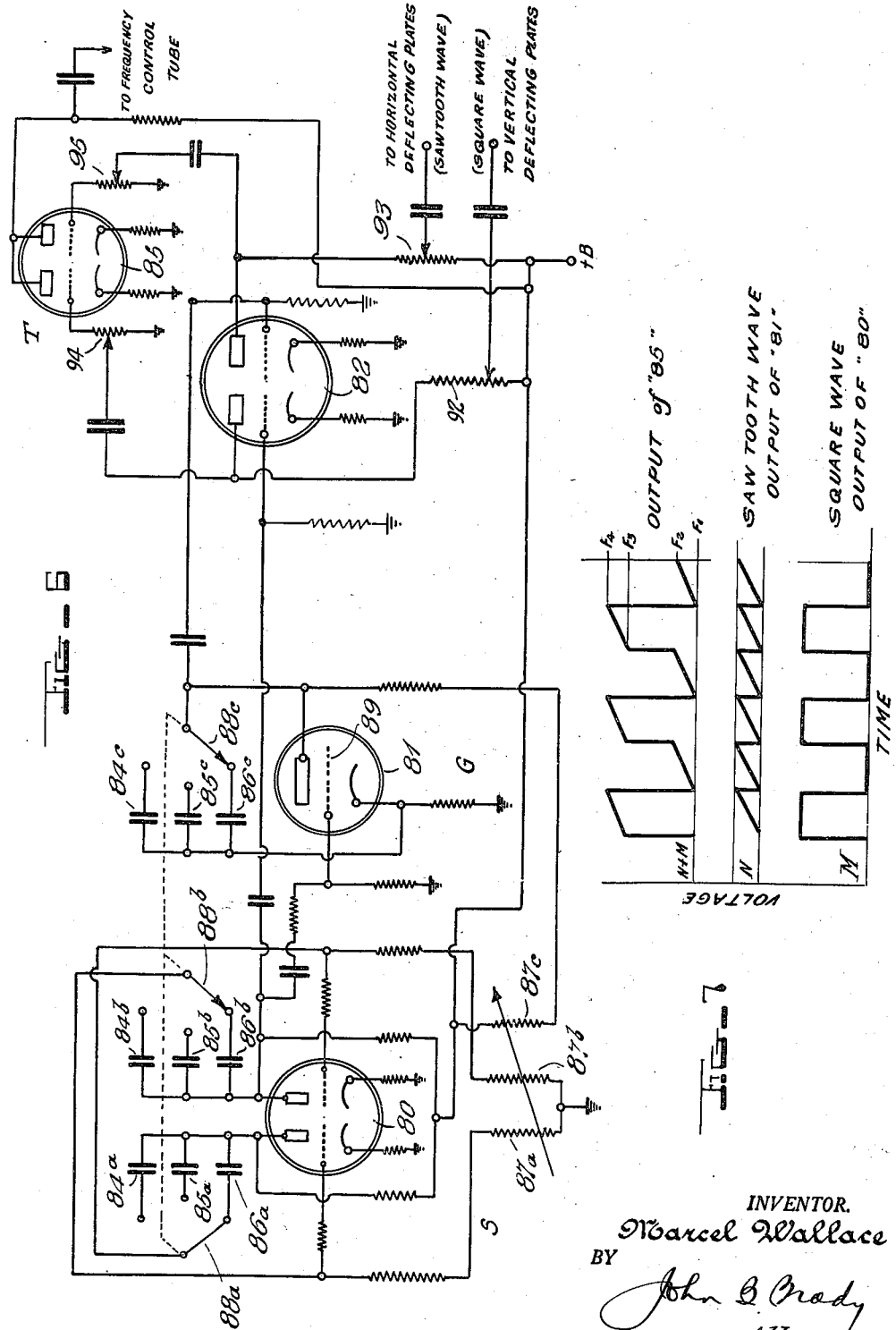

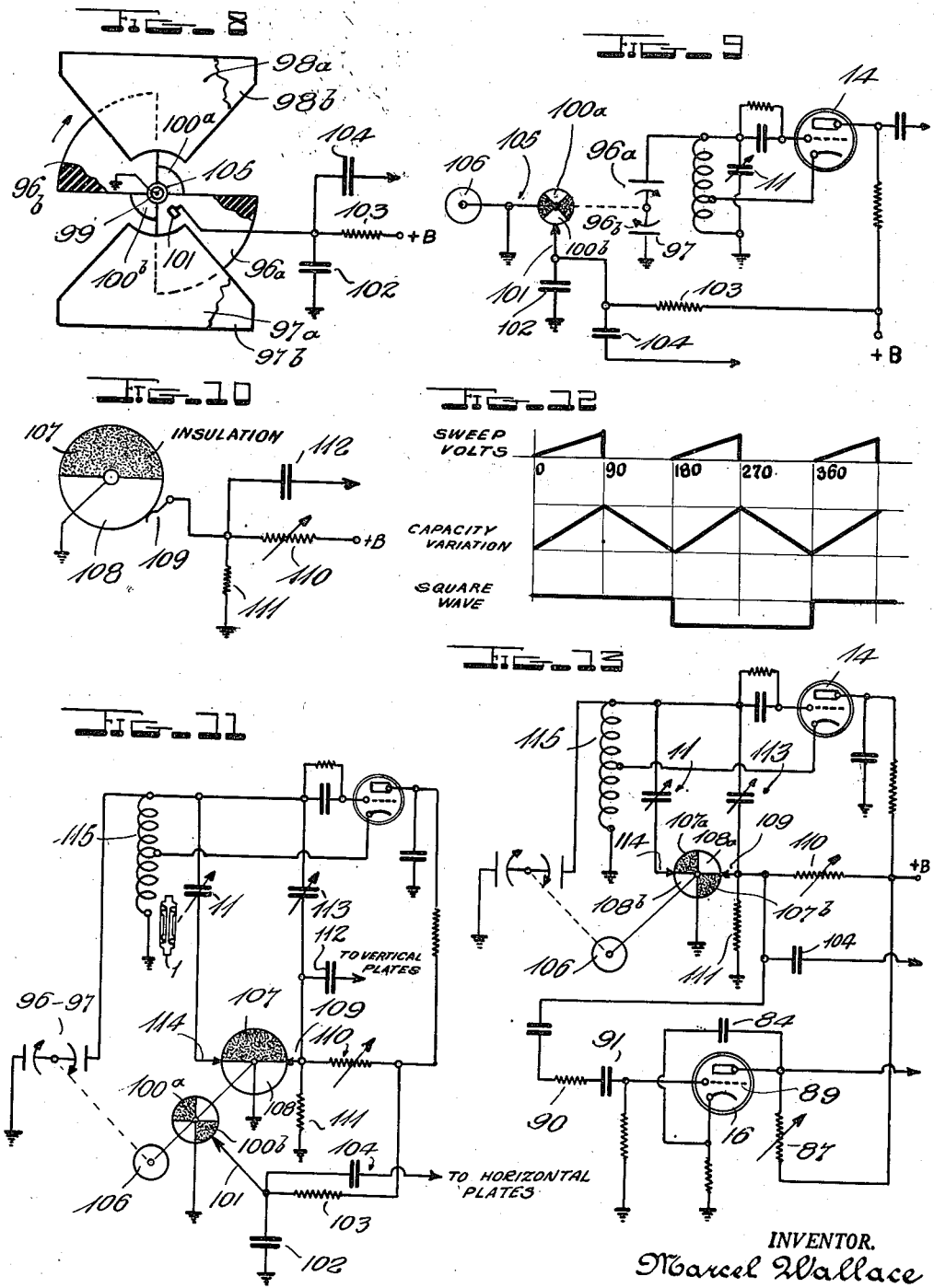

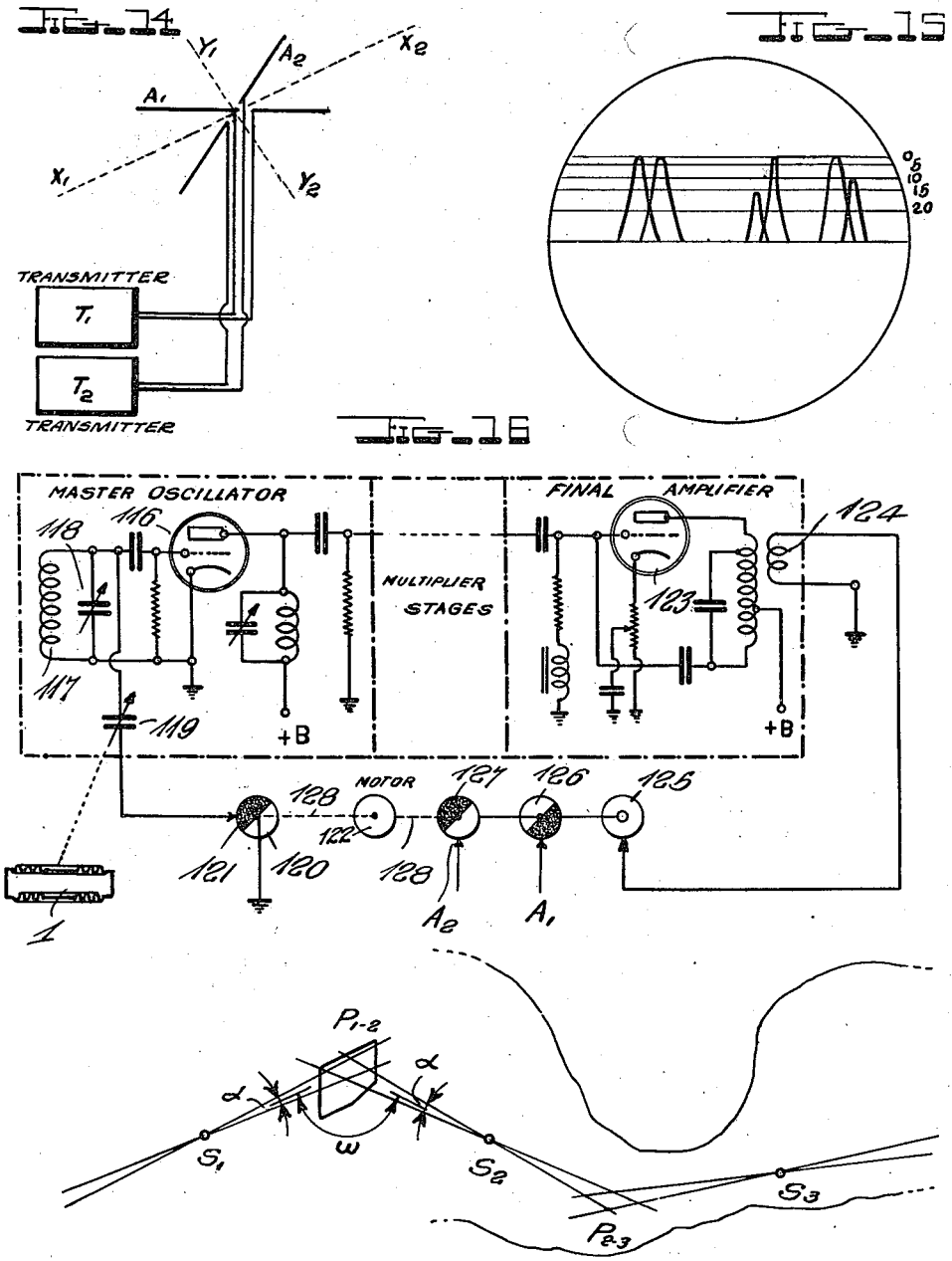

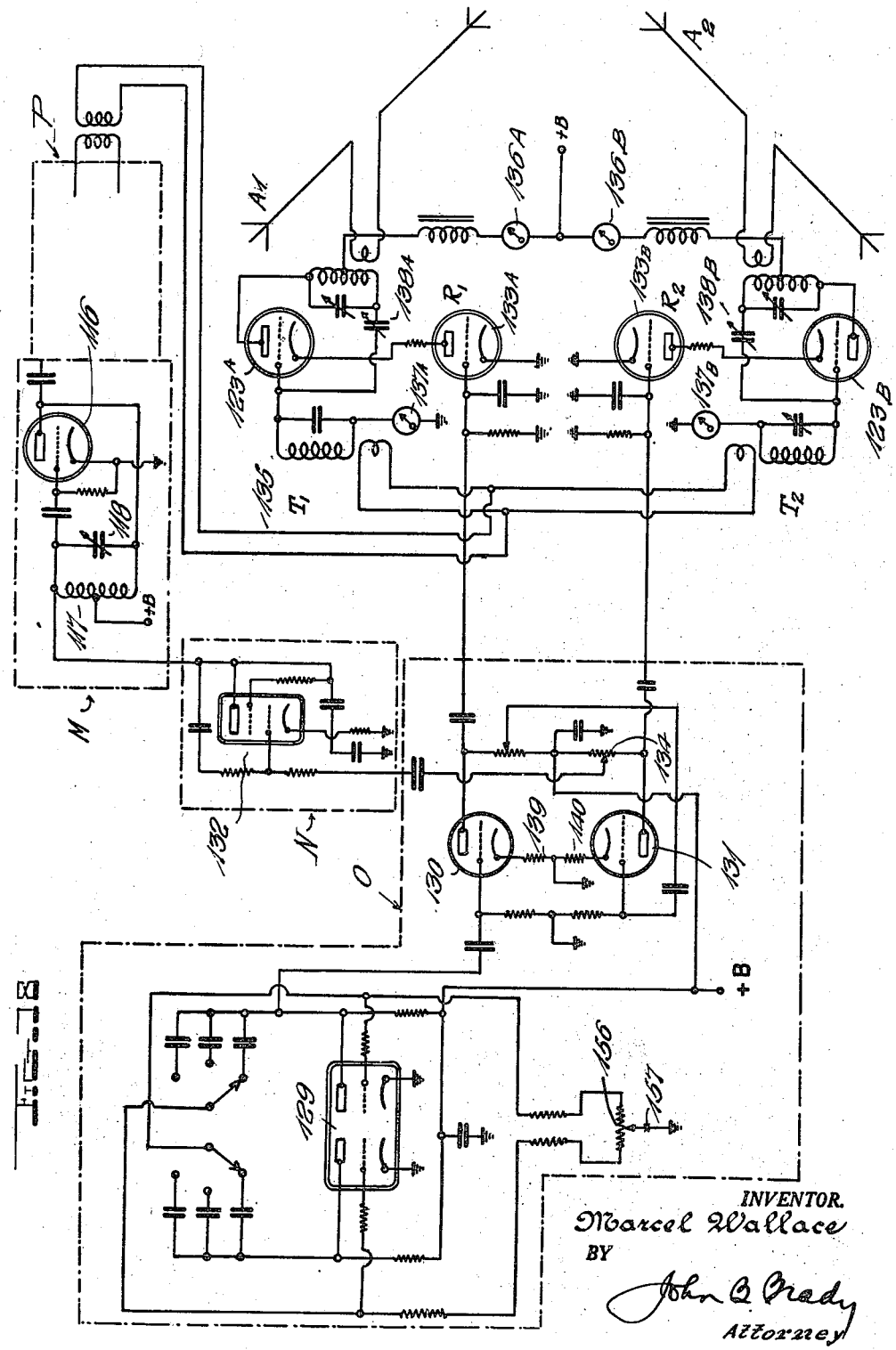

Feb. 23, 1943.                M. WALLACE                    2,312,203
            RADIO BEACON AND PANORAMIC RECEPTION SYSTEM
                     Filed April 20, 1940      11 Sheets-Sheet 8
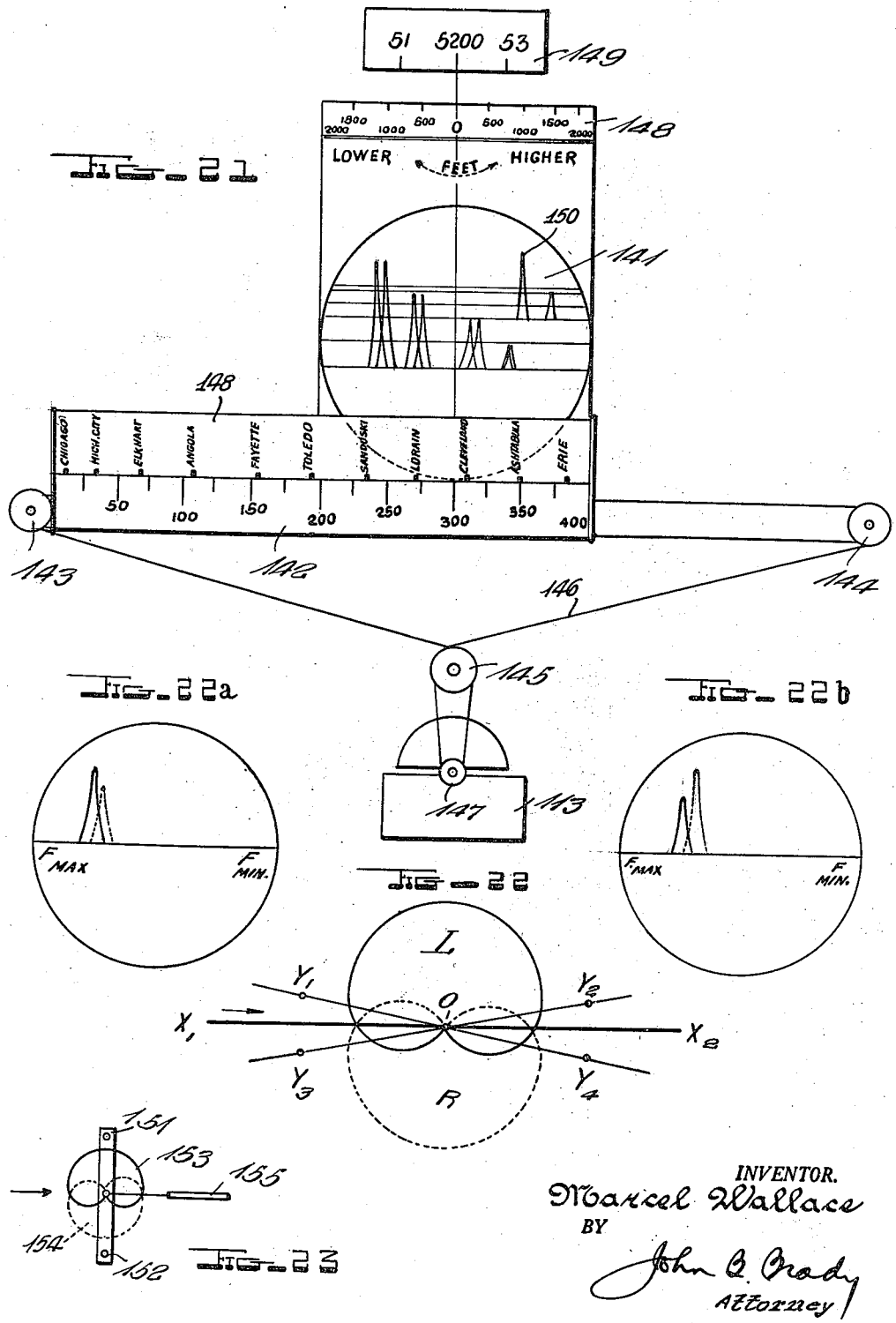
INVENTOR.
Marcel Wallace
BY
John B. Brady
Attorney Feb. 23, 1943. M. WALLACE 2,312,203
RADIO BEACON AND PANORAMIC RECEPTION SYSTEM
Filed April 20, 1940 11 Sheets-Sheet 9
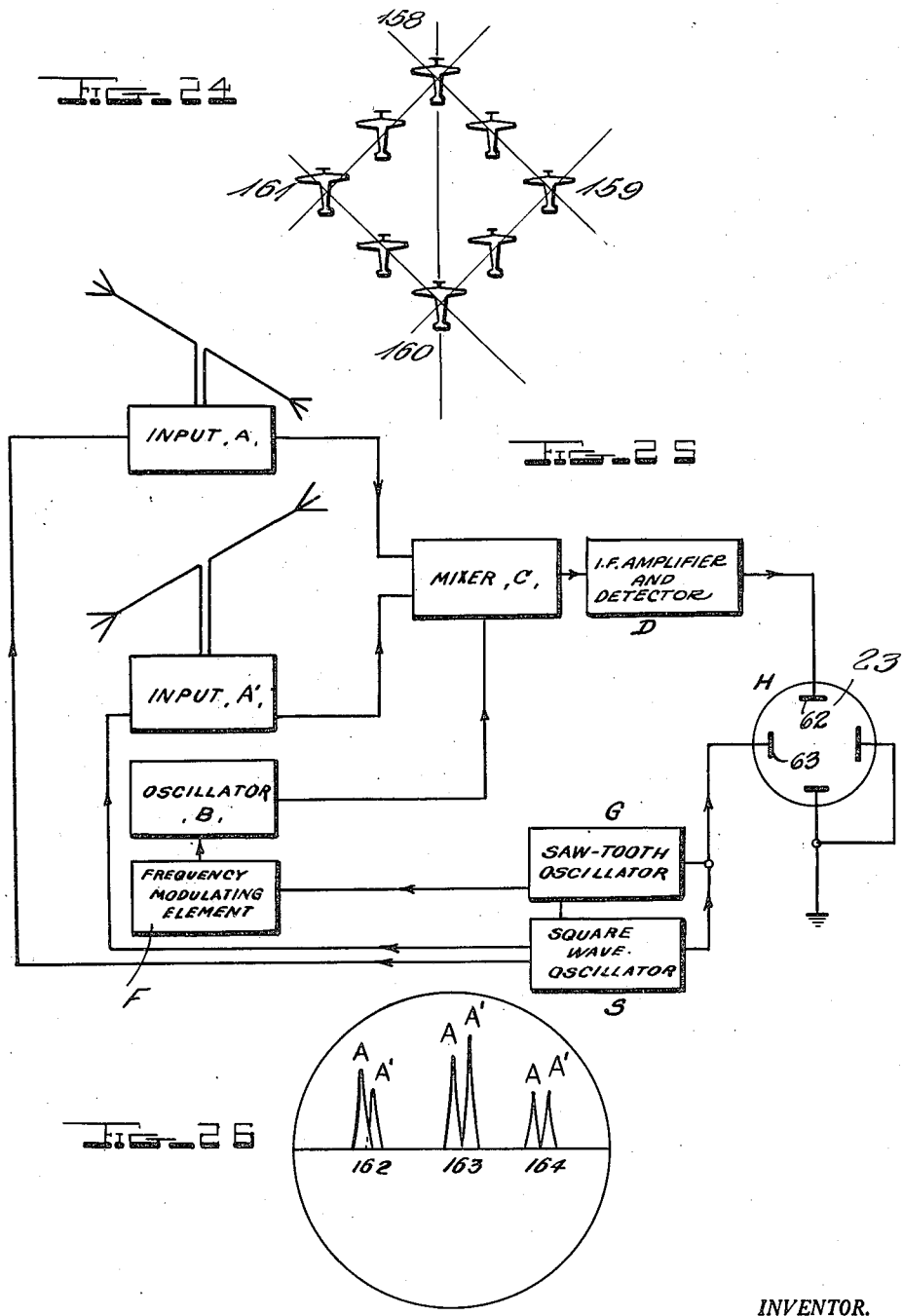
INVENTOR.
Marcel Wallace
BY
John B. Grady
Attorney

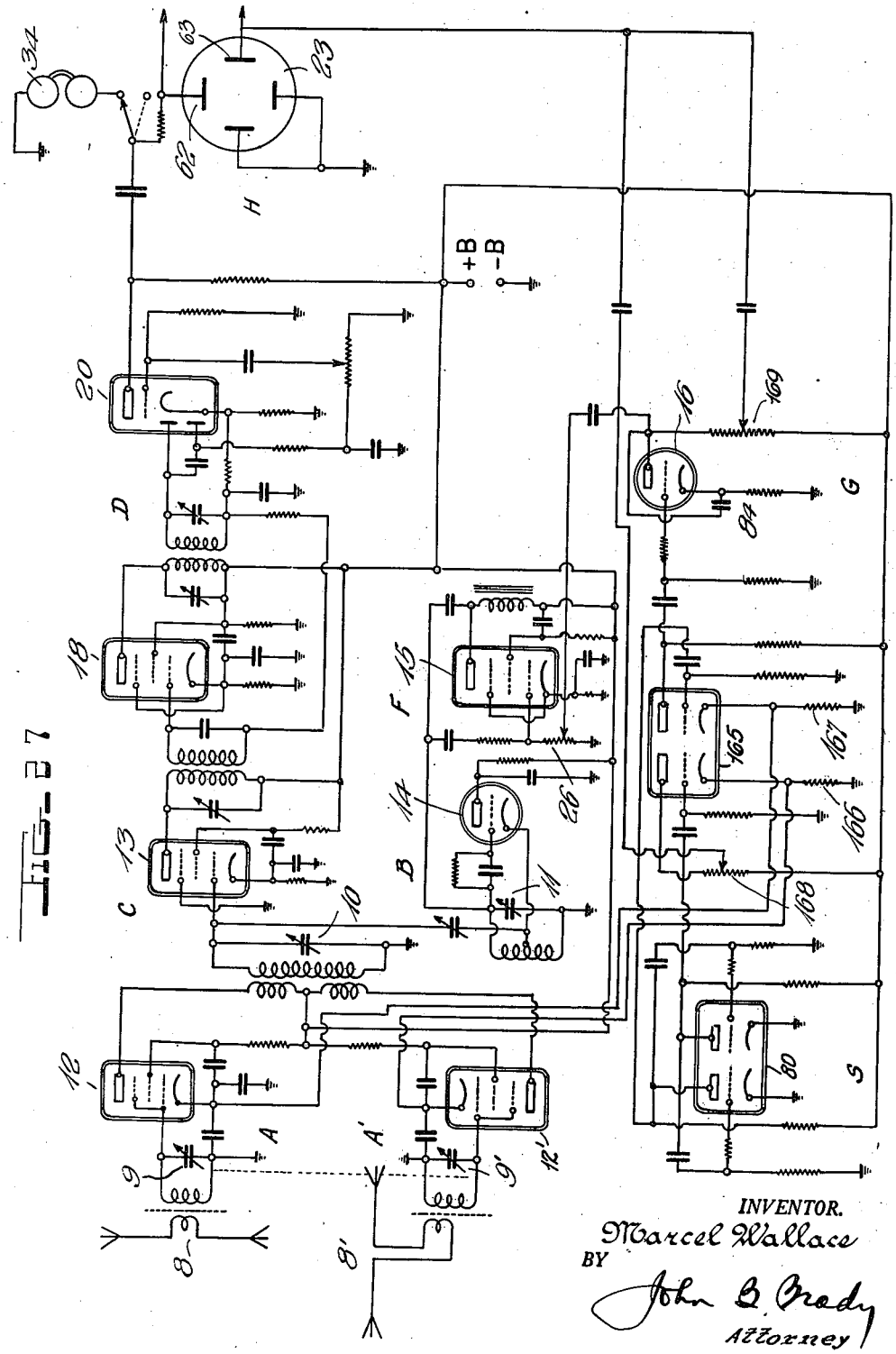

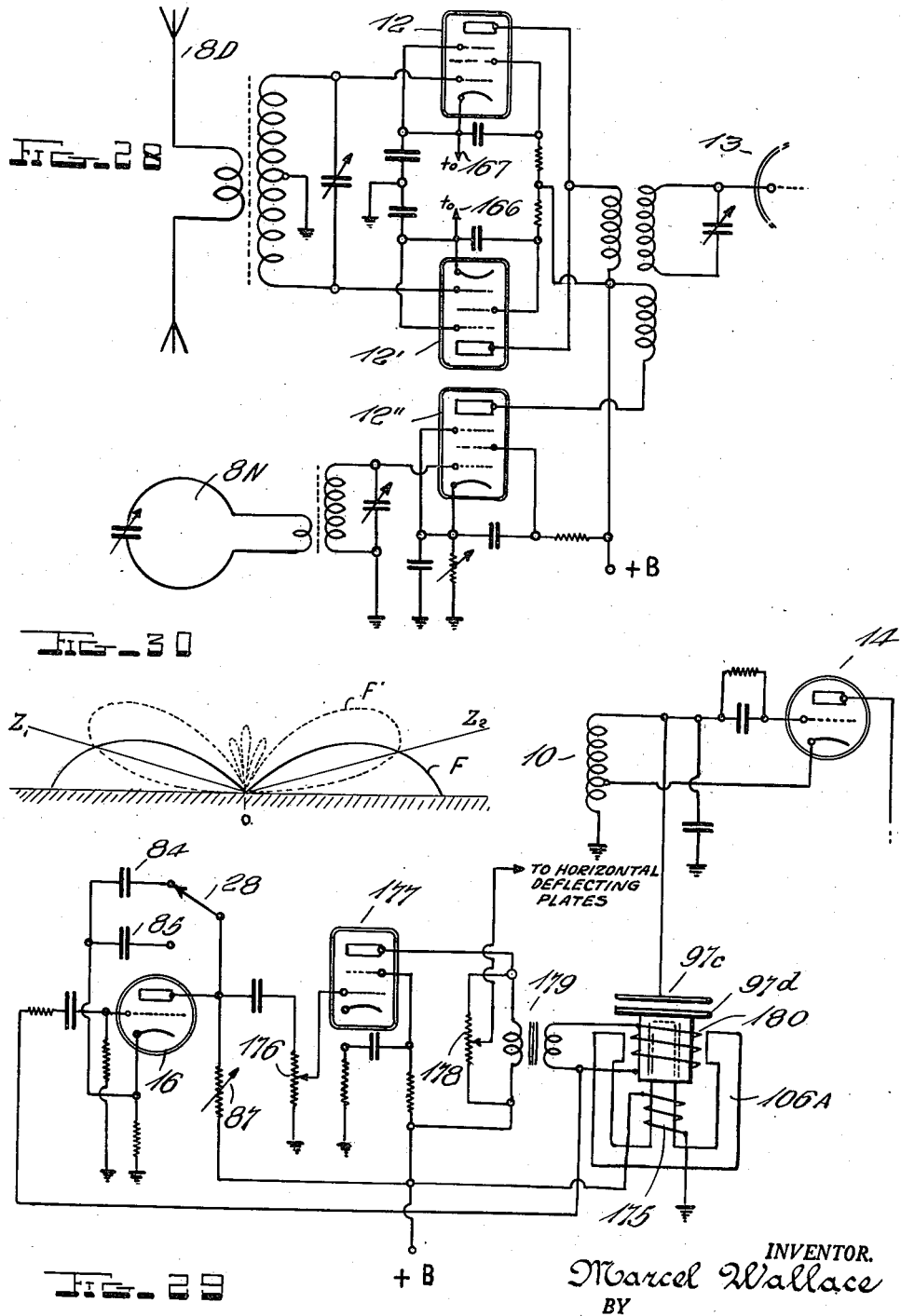

Patented Feb. 23, 1943

2,312,203

UNITED STATES PATENT OFFICE 2,312,203

RADIO BEACON AND PANORAMIC RECEPTION SYSTEM

Marcel Wallace, New York, N. Y., assignor, by mesne assignments, to Panoramic Laboratories, Inc., New York, N. Y., a corporation of New York Application April 20, 1940, Serial No. 330,763

11 Claims. (Cl. 250—11)

My invention relates broadly to systems of radio navigation and more particularly to improved methods and circuit arrangements for radio beacons and panoramic reception systems for use in navigation of mobile bodies.

In my copending patent applications, Serial Numbers 196,520, for Panoramic radio receiving system, filed March 17, 1938, Patent No. 2,279,151, granted April 7, 1942, and 204,470, for Radio navigation system, filed April 26, 1938, Patent No. 2,273,914, granted Feb. 24, 1942, I have shown that by means of a panoramic receiver installed on board of a plane, it is possible to observe one or a plurality of signals which are radiated from transmitting stations located at danger points, such as mountain peaks, for warning the pilot of the approach of the plane to terrain which may be hazardous to aerial navigation.

One of the objects of the present invention is to provide a system for equipping a body, whether fixed or mobile, with a signal generator which emits a characteristic signal of a warning nature for indicating hazards to navigation.

Another object of my invention is to provide a system for emitting a signal of such a nature as to inform those who receive it, of the altitude of a fixed or mobile body equipped with the apparatus of my invention.

A further object of my invention is to provide an arrangement of a signal generator that can be synchronized with a receiver on board of a mobile body, in such a manner that the signal supplied by the generator does not interfere with the reception of another signal on the same frequency originating from another mobile body.

Another object of my invention is to provide means for creating a signal which gives directional information such as the direction of motion of a mobile body, or the direction of the wind at the location of a fixed body for navigational or landing purposes.

A further object of my invention is to provide a remote system for giving an additional set of information by means of transmitted signalling energy such as local pressure at a given location.

Still another object of my invention is to provide a system for imparting the knowledge of the wind velocity at a predetermined location by means of transmitted signalling energy.

Another object of my invention is to provide simple apparatus for the reception and convenient interpretation of signal indications, and information which can be received visually or both visually and aurally, so as to give a warning to the operator immediately upon receipt of any such signal.

A further object of my invention is to provide simple transmitting and receiving apparatus for providing navigational information without moving parts and with all the circuits electronically controlled.

Still another object of my invention is to provide complementary receiving apparatus capable of giving navigational indications received from such transmitters also fully electronically controlled.

A further object of my invention is to provide an electronicaly controlled transmitter capable of changing both its frequency and directivity, at such a rate as to make the signals appear on a panoramic receiver as if simultaneously transmitted, thereby permitting the use of one-half the effective power required by transmitters operating continuously and reducing the problems due to interference between two transmitters.

A still further object of my invention is to provide special dual-frequency beacons which give a directly interpretable indication of direction of "on course" or right, or left, by producing on the screen of a panoramic receiver signals which are either symmetric or asymmetric, higher to the right or left, and corresponding to the side on which the observer is located with respect to the beacon.

Another object of my invention is to provide a system for efficiently utilizing the available frequency spectrum by distributing beacons along an airline, the average frequency of which varies proportionally to their distance from a point of origin and enabling an observer to identify their location from their average frequency and accordingly to also watch the progress along a line of navigation. Such a system is also very economical of the frequency spectrum because it permits using it continuously without "gaps" due to the necessity of separating fixed channels.

A still further object of my invention is to provide a simple system for distinguishing between beacons of a given system and others of another system although such beacons may use the same portion of the frequency spectrum, by changing the rate of frequency change from one system to the other. This is rendered possible by the use of panoramic receivers having means for varying at will their rate of frequency sweep, so as to make it correspond to the rate of frequency variation, or of a harmonic thereof, of a dual-frequency beacon. This feature permits the elimination of sources of periodic noises such as produced by vibrators, motors, etc.

Still another object of my invention is to provide a receiver which can simultaneously indicate the presence of any obstacles above or below the observer, and also how far above or below these obstacles the observer is situated, and to control a warning local transmitter and at the same time indicate a plurality of dual beacons. Such a receiver uses one common indicator which can give all these indications simultaneously.

Another object of my invention is to provide a duel-directional panoramic receiver which can instantaneously indicate the direction of each of a plurality of transmitting stations, independently of their transmission pattern characteristics. I describe herein such receivers in which there are no moving parts, all functions being carried out electronically.

A still further object of my invention is to provide a simple transmitting apparatus which can automatically give an aircraft pilot all the indications required in case the pilot wishes to make a blind landing, such installations being practicable for installation and maintenance in emergency landing fields where no attendants are present.

Figure 17:
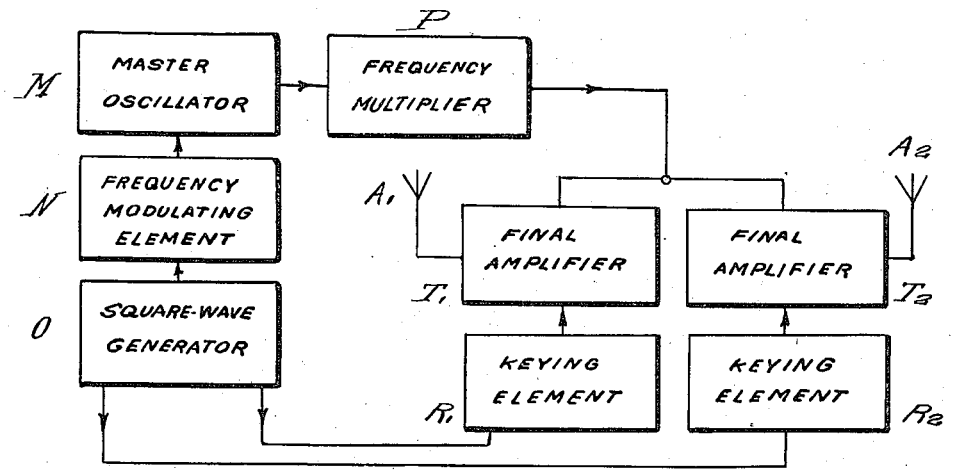
Figure 19:
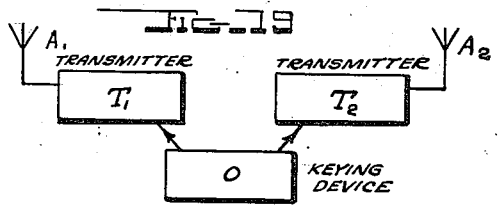

Other and further objects of my invention will be apparent from the specification hereinafter following by reference to the accompanying drawings, in which:

Figure 1 is the diagram of an altimeter controlled transmitter embodying my invention; Fig. 1A is a block diagram showing the interconnections between an altimeter, a transmitter and a receiver according to my invention; Fig. 2 is another block diagram showing in a more detailed form the principal parts and their relationship in a fully electronically controlled panoramic receiver, and of an altimeter controlled transmitter, said receiver tuning off the transmitter automatically so as to prevent interference between the two; Fig. 3 represents a series of curves showing the action of various elements shown in Fig. 2; Fig. 4 is a detailed diagram of a receiver such as shown in Fig. 2; Fig. 5 is a block diagram of another electronically controlled receiver and transmitter similar in function to those shown in Fig. 2, but covering two distinct portions of the frequency spectrum; Fig. 6 shows details of the special elements used in connection with the apparatus shown in Fig. 5; Fig. 7 shows a series of curves explaining the action of various elements of Fig. 5; Fig. 8, a special dynamically balanced condenser combined with a synchronous commutator for obtaining mechanically whatever may be obtained electronically; Fig. 9 is a diagram of an apparatus in which the device of Fig. 8 is used; Fig. 10 shows a commutator and its connections for obtaining a square wave current; Fig. 11 shows how the devices of Figs. 8 and 10 are used in a two-band mechanically controlled panoramic receiver; Fig. 12 is a diagram explaining the action of the various parts of Fig. 11; Fig. 13 shows a combination between an electronic source of sweep voltage and a mechanical commutator and variable condenser and the method of synchronizing these elements; Fig. 14 shows in block form the principles used in a dual-frequency beacon according to my invention; Fig. 15 shows how a plurality of alternately keyed dual-frequency beacon signals appear on the screen of a panoramic receiver on the type of calibration used on such receiver to determine the ratio between two signals; Fig 16 is a diagram of a mechanically controlled alternately keyed dual-frequency beacon; Fig. 17 is a block diagram of an electronically controlled dual-frequency beacon, in which a master oscillator gives alternately two different frequencies; Fig. 18 is a diagram of the transmitter shown in Fig. 17; Fig. 19 is a block diagram of a simplified transmitter in which only two oscillator-transmitters are alternately keyed; Fig. 20 is a sketch showing how remote points can be found by the use of two dual-frequency radio range beacons; Fig. 21 shows the appearance of the screen and dial arrangement of a dual band panoramic receiver, showing simultaneously a plurality of beacons, their geographic position and also a plurality of obstacles and their respective altitudes with respect to the observer; Fig. 22 is a reversible transmission pattern of a dual-frequency beacon creating an equi-signal path; Figs. 22a and 22b show how certain signals transmitted from a transmission pattern such as shown in Fig. 22 appears on a panoramic receiver; Fig. 23 is a diagram of a wind controlled directive beacon; Fig. 24 shows how a plurality of ships having dual-frequency beacons can keep going in a definite formation; Fig. 25 shows in block diagram form a dual-directional panoramic receiver electronically controlled; Fig. 26 shows the indicating screen of such a receiver and how various signals are visually reproduced; Fig. 27 is a diagram of a receiver represented in Fig. 25; Fig. 28 is a modified form of a part of a receiver of the type represented in Fig. 25; Fig. 29 shows a further modified and improved form of circuit embodying my invention; and Fig. 30 represents the transmission patterns of a dual frequency glide path indicating beacon.

In the carrying out of my invention, advantage is taken of the properties of a panoramic receiver, such as described in my copending applications, supra.

In the system of my invention, I provide means capable of:

1. Continuously observing the variations of field strength of two or more signals.
2. Observing the variations of frequency of two or more signals.
3. Determining the frequency of modulation of any signal, by synchronizing the receiver rate of frequency sweep with the modulation of the transmitter.

A signal is generated from the fixed or mobile body, a signal whose frequency is characteristic of the altitude or of the local pressure at the location of that body. A portion of the frequency spectrum must be assigned for the purpose of these indications, and is subdivided according to a predetermined manner, so that a given frequency corresponds to a given altitude. For example, if for altitude zero, (corresponding to sea level) the frequency $F_{min.}$ is assigned and for an altitude of H feet a frequency $F_{max.}$ is allotted, any intermediary altitude, for example $h$, can conveniently correspond to a frequency $$F_h = F_{min.} + \frac{h(F_{max.} - F_{min.})}{H}$$

Instead of this simple linear frequency versus altitude distribution, other functions can be determined, which instead of being linear, can be, for example, exponential, the frequency varying proportionally to the percentage of altitude variation, etc. An element such as an altitude or pressure indicating instrument is employed for controlling the frequency determining circuit of the signal generator.

For example, as shown in Fig. 1, an aneroid barometer 1 is made to vary the distance between plates 2 and 3, electrically insulated from each other by means of insulator 4. The capacity of the resulting condenser 2—3 varies according to the local pressure as impressed upon the barometer. This condenser operates to tune an inductance 5 and the whole tuned circuit determines the frequency of oscillation of a tube 6. This is a simple type of local pressure or altitude indicating oscillator, which forms the basis of other arrangements of my invention described hereinafter.

Such oscillators can be mounted on the various landing fields in different geographical locations, so as to inform the incoming pilots as to the actual local pressure and to permit the correction of their pressure-controlled altimeters. In order to effect this correction, the pilot must know what the actual altitude of that field is, which information can be obtained from proper charts. The pilots can read in these charts what would be the normal pressure and from the reading obtained from the frequency of the oscillator, the positive or negative correction of the altimeter is indicated.

The readings of the indications given by such oscillations, are best made with a panoramic receiver, such as described in my copending applications, supra. The screen of the cathode ray tube which is the visual indicating means used in such receivers, can be calibrated in frequency or, preferably, in altitude, and from the position where such a signal appears on the screen, the altitude or local pressure is indicated.

If the signal generator is mounted on board of an airplane also equipped with a panoramic receiver which tunes in the "altitude band" of the frequency spectrum, the locally generated signal covers that part of the screen which corresponds to its own altitude. If another airplane is in the proximity of the first, and at the same altitude, the observer will not be able, therefore, to distinguish its signal, on account of said local signal.

In order to avoid this, I provide a combination between the local signal generator and the receiver, in such a manner that the latter controls the first. By means of a synchronous switch, which can be either mechanical or electronic, the transmitter is shut-off entirely, or only reduced in power, periodically, every time the receiver tunes through or must indicate a frequency close to that of the local transmitter.

An electronically controlled combination of transmitter and receiver is shown in Fig. 2 in the form of a block diagram for explaining my invention. The panoramic receiver illustrated consists of a signal input circuit A, an oscillator B, a mixer C and two channels of intermediate frequency amplifiers D and E. The oscillator is periodically tuned over a band of frequency by a frequency modulating tube F which, in turn, is controlled by a sweep voltage generator G. This generator produces the source of sweep voltage applied to one set of deflecting plates of the cathode ray tube H. The intermediate frequency channel D is sharply tuned and the signals passing through it are detected and applied to the other set of deflecting plates of the cathode ray tube.

The parallel channel E is broadly tuned or tuned slightly off the frequency of channel D and develops at its peak a much weaker signal than channel D. However, over certain portions of the frequency spectrum, immediately adjacent to the band pass characteristics of the channel D, it develops a stronger signal.

This is illustrated in Fig. 3, in which the abscissa represents the frequency variation (or time variation, the two being linked together) and the ordinate represents gain of channels D and E or power developed by oscillator transmitter J.

Supposing that the oscillator transmitter J emits a signal on frequency $F_h$, and the panoramic receiver starts tuning from a frequency $F_{min}$ towards a frequency $F_{max}$. As it approaches frequency $F_h$, it passes through a region $F_1$—$F_2$ when the I. F. channel E develops an impulse which is applied at once to a keying tube which triggers off the transmitter J, (see curve J on Fig. 3), before or almost at the time when the channel D could start building up a signal from the transmitter. The time constants of the trigger circuit are such as to maintain the transmitter turned off during a predetermined time interval, equivalent to a variation of frequency of $F_2$—$F_3$, and when the oscillator starts again, its frequency is out of the tuning range of the receiver, so that the latter is unaffected by the presence of that local signal. The signals picked up by the channel D are detected, amplified and applied to the other set of deflecting plates of the cathode ray tube H. These signals will be always synchronized with the sweep applied to the first set of deflecting plates, so that each deflection will appear stationary, in a position determined by the frequency of the signal and of an amplitude determined by the signal strength.

In parallel with the cathode ray tube, it is possible to feed an audible device such as a loudspeaker or head-phones. This is important in case of collision warnings. The speed of the planes being great, it is possible that the pilot may not be aware of the appearance of a visual danger signal on the screen, but his attention will be drawn at once if this signal will produce a distinctive noise in the loud-speaker, which is exactly what happens. This is a very important feature of my invention, which adds to the safety of the flier.

Automatic volume control can be incorporated in the panoramic receiver, as it will be described hereinafter. The effect of this control upon the signals is that it will prevent a signal from building up in amplitude beyond a given point but, instead, it will compress the other signals weaker than it, so as to maintain their amplitudes an indication of their field strength.

In the circuit diagram of Fig. 4, the input circuit A is constituted by a receiving antenna 8, an inductance tuned by condenser 9 and an amplifier tube 12. The frequency modulated oscillator B is constituted by the triode 14 and a circuit tuned by condenser 11. Directly connected to the tuned circuit of this oscillator, I show the frequency modulating channel F constituted by a thermionic tube 15 which acts as a reactance in parallel with said tuned circuit. By properly adjusting phase relationship between the input and output circuits of tube 115, as determined by capacities, resistors and choke (40, 41, 42), the reactance of this tube will increase or decrease the frequency of the oscillator 14 by an amount depending on the voltage impressed on the grid 43 of the tube 15 and in a direction depending on its polarity.

An alternating voltage, preferably produced by a saw-tooth oscillator 16 and amplified by tube 17 (corresponding to G in the block diagram) is fed to the variable reactance tube 15, through a potentiometer 26 and a voltage balancing potentiometer 70 which is shunted by a battery 71. The adjustment of potentiometer 70 controls the biasing voltage on the grid 43, consequently the reactance value of the tube 15 at the average sawtooth voltage and determines, therefore, the average frequency at which the receiver will operate, and potentiometer 26 controls the amplitude of the voltage applied to grid 43 which in turn controls the amount of frequency sweep of tube 15. The frequency of the sweep voltage generator can be adjusted by means of a multi-position selector switch 28 and the plate voltage controlling rheostat 87.

The converter corresponding to C is tube 13 whose grid 44 is coupled to the input amplifier tube 12 and frequency modulated oscillator 14. The converted signal is developed in the I. F. transformer 45 having two secondaries shown at 36 and 37. The secondary 36 is tuned to the same frequency as the primary of transformer 45 and feeds the high gain, sharply tuned channel corresponding to D, composed of two amplifying stages comprising the tubes 18 and 19 and transformers 46 and 47.

The signals are then detected and reamplified by means of a combined diode-triode thermionic tube 20. One diode plate 48 applies the rectified signal to a load 54 and the voltage drop through it is used to automatically control the gain of the amplifying tubes 18 and 19 by applying appropriate voltages at their grids through resistors 50 and 51, which are by-passed with condensers 53 and 52. The action of this automatic volume control is very important in the operation of the system of my invention.

The other diode 49 is connected to the diode 48 by means of a condenser 55 and develops a rectified pulsating current which is applied to an amplitude controlling potentiometer 30 and from there through a condenser 56 to the grid of the triode section of the tube, which acts as a low frequency amplifier of the pulsating current.

A potentiometer 31 is provided for the important function of "thresholding" the signals. This operates as follows: The anode 49 of the diode-triode tube 20 is returned to the power supply circuit by means of resistors 72 and 73 to this potentiometer 31 a leg of which is at ground potential. The anode potential is taken from the cathode ray elements power supply 74 which is dropped to ground potential through a series of resistors including 75, 76, 77 and 78, some of which act as "focus" and intensity controls for said cathode ray tube.

By being able to make the anode 49 of any potential desired from zero up to a few hundred volts negative, it is possible to cut out or prevent detection of any signal which does not exceed a desired value. This control acts, consequently, as an adjustable threshold device, which is useful for eliminating either noises (which are below the signal levels) or weak signals which are not interesting to the observer and which may confuse him. This threshold potentiometer can be calibrated in field strength, whether micro-volts or decibels for measuring the field strength of any signal. It is therefore useful also for measuring the difference of deflection amplitude between the deflection amplitudes of two signals.

The potentiometer 30 which controls the amplitude of the signals applied to the output device, will cut all signals in such a manner as to reduce them all in the same proportion. Therefore, the signal ratios remain constant. By using, however, the threshold control we change the ratio between the signal amplitudes and this becomes useful when we want to exaggerate or emphasize the difference of two signals nearly equal in amplitude, as is necessary in the dual-frequency beacons described hereinafter.

The pulses resulting from the reception of a series of stations are of extremely short duration, this depending upon the frequency of the sweep-voltage and the total frequency band covered and the selectivity of the I. F. stages. This means that the amplifier must have certain frequency characteristics which permit the amplification of sufficiently high frequencies, of the order of a few thousand cycles per second. These frequency characteristics are determined by the values of the grid, plate and cathode resistors 57, 58, 60. A resistor 59 connected to the high voltage source maintains the exact bias required under conditions of varying load. The amplified pulses are applied through a condenser 61 to one deflecting plate 62 of the cathode ray tube 23, but it can also be connected by means of switch 35 to an auditive output device 34 for audible warning. The perpendicular deflecting plate 63 of the cathode ray tube is connected to the sweep voltage generator 16 after amplifying its output through tube 17. The frequency of this sweep is sufficiently high to produce a rapid sweep of the cathode ray beam, which appears substantially flickerless on the fluorescent screen of the cathode ray tube.

The secondary 37 of I. F. transformer 45 feeds the transformer 64 which is connected to a diode detector and amplifier tube 21 which corresponds to the amplifying channel E of Fig. 2. A very strong signal produces across the condenser 65 and resistor 66 a substantial negative voltage which is applied to the grid of a keying or trigger tube 22, (corresponding to I). The plate of this tube is connected to the cathode of the transmitter oscillator tube 6 whose frequency is controlled, as explained hereinbefore, by the variations of pressure as impressed upon barometer 1.

The tube 22 offers the proper amount of resistance in the cathode of the oscillator 6 when no signal is applied to the grid 68, which is returned to ground by the grid resistor 67.

A signal however builds up on the condenser 69 and grid 68 a negative voltage which triggers off the plate current of tube 6 which stays shut off until the charge of condenser 69 leaks out through resistors 66—67.

The time constants of this circuit can be adjusted to keep the transmitter turned off just the length of time desired, as explained hereinafter.

The voltage developed by the tube 21 is very low even when signals of a few thousand micro-volts are present, as may be received from powerful nearby stations, but is great in the presence of the local signal which builds up to several hundred thousand micro-volts in that stage, before the sharply tuned stages 18, 19, have time to build a substantial signal. A variable coupling between the primary and secondary of transformer 64 permits the proper adjustment of the cut-off of the local transmitter. The tuning of this primary and secondary is such as to make it act as a filter of broad band pass characteristics.

All the potentials required for the panoramic receiver are produced by a common source of power supply and all can have a common ground return to the chassis.

The panoramic receiver described herein can be made to cover a rather substantial band by ganging the condensers 9, 10, 11. The electronic sweep will produce a panoramic reception effect on the screen of the oscillograph 23, of a band of frequencies whose width can be adjusted by the potentiometer 26. If the constants of the circuit of tube 15 are properly adjusted, it is possible to make the frequency shift of the oscillator 14 equal both above and below its natural frequency, which permits a panoramic observation of the band immediately above or below a given "center frequency." If the total band which must be covered is not too great, the input stages 12, 13, may be made of sufficiently broad band pass characteristics to avoid the necessity of tuning the condensers 9 and 10 and still obtain substantial linearity of response over the desired band.

In this case, we can vary the "center frequency" of the panoramic receiver either by adjusting the oscillator condenser 11 or by adjusting the center arm of biasing potentiometer 70. This variation can take place either manually or automatically and in the latter case it can be effected by either the same barometer 1, which controls the transmitter oscillator, by mechanically linking it to condenser 11, (or potentiometer 70) or by another similarly constructed barometer (or altimeter). In Fig. 4, I have shown a dotted line between 11 and 1 to show a mechanical link.

This control of the condenser 11 by an altimeter, will permit a constant retuning of the "center frequency" of the panoramic receiver, this center being at all times at the frequency corresponding to its altitude, and the frequency produced by the local oscillator-transmitter J. The frequencies above and below it represent altitudes above and below it and the band covered can be such as to cover an altitude of, for example, 2500 feet above and 2500 below the airplane. This is useful if the frequency assignment covers a relatively wide band, so as to take care of very great altitudes. The ceiling of modern planes increases continuously and if we would have to cover on a few inches of an oscillograph screen all the band, the readings may be difficult to make or would not have sufficient accuracy.

With this method, however, of centering the observation and limiting it to a certain height above and below, this objection is removed and, besides, the pilot has all the warning and information he wishes, as he is not interested in what happens too high up or too far below him.

This centering of the local altitude, corresponding to the frequency of the locally generated signal greatly simplifies the design of the commutator controlling this signal. This commutator can be either mechanical or electronic, acting every time when the receiver tunes through the center region of its band.

Such a continuous adjustment of condenser 11 would not be required for a receiver used on the control tower of an airdrome which would wish to observe the whole altitude band at any time, but in these cases a very large diameter oscillograph may be used, and a mechanically controlled panoramic receiver provided which can be made to cover conveniently very wide frequency bands.

In my copending applications, supra, I have shown how I can simultaneously receive on a panoramic receiver two bands of frequency which can be observed on two different portions of the oscillograph tube. This is a very important requirement if the receiver is to be used for navigational purposes, so as to avoid carrying on board several receivers. It may be assumed, for example, that the flier wishes to follow a string of radio range beacons of any dangerous obstacle, fixed or mobile. The beacons may operate on one band of frequencies and the collision signals on another band. An electronically controlled receiver showing simultaneously two bands of frequencies can be used advantageously for the purpose. The principle of its operation, as distinguished from the first is the following: Synchronously with the saw-tooth generator, I provide means for generating a "square-wave" alternating current. This is composed of a series of electrical impulses of a constant amplitude of half the frequency of the saw-tooth wave each having a duration equal to the duration of each "saw-tooth" impulse. These impulses are intermittent, each being followed by an equal time period when no current is generated.

Fig. 7 shows on its lower part as M three cycles of such square-wave pulsating current impulses; N represents six cycles of the saw-tooth synchronous alternating current impulses and M+N represents an alternating current resulting from the combination or addition of these two types of impulses. The frequency controlling tube 15 (F in the block diagram, Fig. 5), in which I provide a circuit for feeding a current such as the one represented as M+N will alternately cover two bands of frequency whose separation from each other will be determined by the amplitude of the square wave input.

On the right side of Fig. 7, I show an ordinate representing frequency variation as produced by such a combination wave in the variable frequency oscillator. It alternately covers the frequencies $F_1$, $F_2$ and $F_3$, $F_4$. The frequency separation between $F_2$ and $F_3$ can be reduced to zero by reducing the amplitude of the square wave voltage or be increased to a maximum by increasing that voltage. It can, therefore, be seen that variations of amplitude of M will shift only one band of frequencies ($F_3$ to $F_4$) and will not affect the other band. This shift can be obtained by applying the square wave to a biasing potentiometer such as 70 (Fig. 4).

Fig. 5 represents another block diagram showing how this receiver operates. The same letters are used as in Fig. 2 for the common elements of the two types of receiver-transmitter combinations. In Fig. 5 in addition S represents the square-wave generator, and T the mixer of the saw-tooth and square-wave currents. Previously to being mixed, the saw-tooth component is applied to one of the deflecting plates 63 of the cathode ray tube and the square-wave component to another deflecting plate 62, normal to the first, where it is combined with the signal from the channel D.

The effect of this application of the square-wave is to recurrently, and at the end of each cycle of the saw-tooth wave, shift the reference zero line of the cathode ray tube, so as to alternately obtain two parallel lines on which the signals contained in the bands $F_1$ to $F_2$ and, respectively, $F_3$ to $F_4$ are appearing.

The linear separation between these parallel lines is a function of the amplitude of the square-wave voltage applied to the deflecting plate, and this is controlled through any appropriate means. The mixing can be obtained, for example, directly in the frequency modulating element, by applying saw-tooth voltage as shown in Fig. 4 and the square-wave voltage to biasing potentiometer 70.

Fig. 6 shows a detailed diagram of the elements G, S and T of Fig. 5. Tube 80 is a double triode, the grids of which are cross-connected in such a way that each triode section becomes alternately blocked. The frequency of this blocking action is determined by the rate of charge and discharge of condenser pairs 84, 85, 86 (groups $a$ and $b$) a pair of which are selected by switch arms 88$a$ and 88$b$, and also by the value of the dual rheostats 87$a$ and 87$b$.

Another tube 81 acts as a saw-tooth oscillator and the frequency controlling elements, that is, condensers 84$c$, 85$c$, 86$c$ and rheostat 87$c$, are so chosen that they produce a saw-tooth current of practically the same frequency as the square-wave current.

The synchronism is complete, however, by connecting the grid 89 of tube 81 to one of the plates of the tube 80. The frequency control of both tubes is therefore obtained by single controls 88$a$, 88$b$, 88$c$ and 87$a$, 87$b$ and 87$c$.

Tube 82 is another double triode which is used in the event that high signal voltages are required. Tube 82 acts as an amplifier in connection with the saw-tooth and square-wave oscillators.

The amplitude controls 92 and 93 are used to control the voltage of the deflecting currents put into the vertical and horizontal deflecting plates respectively, of the cathode ray tube and the amplitude controls 94 and 95 are used to control the voltages applied to the grids of the mixing tube 85 (T in Fig. 5). The mixed current obtained from the plates of this tube is applied to the frequency controlling tube F.

The same results, as obtained by purely electronic means, can very well be obtained by either purely mechanical or combined electronic and mechanical means. The mechanically frequency modulated oscillator is quite practical and readily made. A rapidly rotating motor driven condenser produces the frequency shift required. One precaution, however, must be taken in avoiding frictional contacts in the tuned circuit, which are invariably noisy, mostly on high frequencies. The best method to avoid this is by using floating rotors, which are not connected to the circuit, except through their varying capacity to two opposite stators. Another precaution which must be taken is to properly balance the rotors dynamically, so as to avoid vibration. This can be obtained by using rotors having several blades, two, three or more.

The effect of such multi-bladed rotors is to speed up the number of images for a given motor speed. In ultra-high frequency work, where the periodical variation of capacity required is quite small and amounting only to a few micro-microfarads, I prefer to obtain the capacity variations necessary by simply rotating a dielectric of high constant between two stator plates connected in the tuned circuit. Several such dielectric rotors can be coupled on one shaft to tune as many circuits as required. One of these rotors can be used for mechanically producing a source of sweep voltage, by the periodical charge and discharge of a condenser, as described in my copending applications, supra. Fig. 8 is an example of such a construction, in which 96$a$, 96$b$ represent the two blades of a dielectric rotor having a 90° opening and rotating between one or two pairs of stator blades 97$a$, 97$b$ and 98$a$, 98$b$. We have in fact two distinct variable condensers which can be used in two different circuits or can be connected together for obtaining a larger variable capacitor.

The center of this rotor has a metal bushing 99 which is grounded through the shaft 105 of the motor 106 (Fig. 9) rotating it, and also two small metal sectors 100$a$, 100$b$, connecting each of the blades 96$a$ and 96$b$. A brush 101 is riding alternately either over the dielectric or over the grounded metal sectors in such a way as to pass from metal to dielectric exactly at the moment of maximum or minimum capacity of the condenser. This brush periodically discharges condenser 102 to ground which condenser becomes charged through a resistor 103 when the brush rides over the dielectric.

The condenser 102 becomes a mechanical source of sweep voltage which is noiseless because the only frictional contact which takes place is to either the dielectric or to a grounded part of the receiver, which is not a part of the tuned circuit.

The electrical connections of such a synchronized dielectric condenser and sweep voltage generator are shown in Fig. 9 in which, for the sake of simplicity, I show only one periodically tuned circuit, an oscillator which can be the element B of the block diagrams. The synchronized condenser and sweep generator replace the elements F and G of those diagrams.

By a slight addition to this construction, I can obtain an alternating coverage of two bands shown on two different lines on the screen of the cathode ray tube, as shown in block diagram Fig. 5.

On the same shaft 105 of this rotor, I mount a commutator composed of two equal sectors 107 and 108, Fig. 10, of double the opening of the blades 96$a$, 96$b$, that is 180°. One of these sectors is of metal and grounded to the shaft, and thence to the chassis; the other sector is of an insulating material. A brush 109 is connected to a high resistance potentiometer 110—111, connected on one side to a source of direct current (anode supply for example) and grounded on the other side. This brush will be alternately at a certain voltage or at ground potential, as the commutator rotates; a square wave is consequently created, mechanically, which can serve through condenser 12 for shifting the image on the cathode ray tube as explained before. The same commutator can serve for alternatingly selecting one of two condensers which tune the oscillator circuit; it can also serve for mechanically shutting off or reducing the power of an altitude-indicating oscillator, as described above. Such a mechanical commutator can be made to open the cathode circuit of the oscillator for predetermined periods of time corresponding to the angle of the commutator sectors. The transmitter can be keyed off, for example, alternately during each part of that rotation cycle which produces images of signals on the screen of the receiver.

This can be better seen in Fig. 11 where, instead of having a condenser 11 permanently connected in the tuning circuit, I show two condensers 11 and 113, each being alternately connected through brushes shown respectively at 114 and 109, to the ground.

Two different frequency portions are then covered by the rotating condenser 96—97 previously described. By individually tuning the condensers 11 and 113, each band may be separately shifted. Condenser 11 can, as shown in Fig. 11, be controlled by a pressure controlled device such as an altimeter 1, and condenser 113 may be manually controlled for special purposes, as shown hereinafter.

The block diagram of Fig. 5 can be fully adapted to this arrangement.

The type of mechanically produced sweep voltage just described has one disadvantage: One-half of the images are lost by grounding the condenser 102 half of the time. The result of this is more tendency to flicker and less brilliancy of the image, as evident from Fig. 12. I can, however, advantageously, combine electronic sweep and mechanically produced square wave with elimination of this disadvantage.

Figs. 13 and 29 show such arrangements. In Fig. 13 the condenser 102 has been replaced by a saw-tooth oscillator 16 whose grid 89 is synchronized to a mechanical square-wave generator similar to the one heretofore described, but using the 90° sectors 107a, 108a, 107b, 108b.

This form of sector alternately switches condensers 11 and 113, at double the rate obtained before. The number of images obtained on the screen is double, because each alternate saw-tooth cycle serves to put on the screen one of the frequency bands covered.

In Fig. 29, I show a combination of electronic means and mechanical means which permit the use of double the number of images, with consequent double brightness of the signals. Instead of using a motor which rotates a condenser, I use in this case a loud speaker unit 106A which replaces the motor 106 and has a field coil 175 and a moving coil 180 which bears a metal disc 97d, whose distance from a similar disc 97c can vary at a rate which is determined by the vibration of said moving coil.

These discs are in fact the armatures of a periodically variable condenser of a panoramic receiver, such as shown as 96—97 in Fig. 9. The rate of frequency variation of this condenser is determined by the rate of vibration of this moving coil 180 which rate is determined by an alternating current produced by the sweep voltage generator 16 and amplified by tube 177.

This frequency can be adjusted at will by variable adjustments 87 and 28. The extent of frequency variation is determined by the amplitude of vibration of said moving coil 180 and condenser plate 97d and this is adjusted by means of potentiometer 176. The same potentiometer controls also the extent of the movement of the cathode ray beam, so that by increasing or decreasing the frequency band, the extent of the sweep may be automatically extended or decreased. A separate potentiometer 178 at the output of tube 177 permits adjustments of the sweep which are independent of the frequency adjustments. Naturally, there is a perfect synchronism between such a frequency variation and the sweep, their source being pulsating current produced by the same tube 16. This arrangement has also the advantage of being able to follow much greater speeds than a double blade motor driven condenser, and is free from frictional noises.

In Fig. 1, I have shown a simple transmitter-oscillator whose frequency is controlled by the local atmospheric pressure. I shall show now how I can supplement this information with that of a direction, which may be readily interpreted to indicate a given course, or to directly indicate "right" and "left" with respect to said course. Two transmitters have to be used instead of one, each operating on a frequency slightly different from the other, each of these transmitters emitting a directional signal in such an angular relation to each other, as to create an equi-signal path along said course.

Fig. 14 shows such an arrangement in which $T_1$ and $T_2$ are such transmitters, each feeding respectively into the dipoles $A_1$ and $A_2$ at right angles, whereby the courses $X_1$, $X_2$ and $Y_1$, $Y_2$ are created. Supposing now that a panoramic receiver is covering a frequency band of 2.5 mc., for example, from 122.5 to 125 mc., spread over 2.5 inches of a cathode ray tube screen. One-eighth inch separation between two signals would mean 0.125 mc. If the two signals produced by $T_1$ and $T_2$ are, in other words, 0.125 mc. apart from each other, they will appear on the screen as two deflections at ⅛″ separation. If the observer is on the equi-signal path, the peaks of the two signals will appear equally high. If he is on one side, or the other, one peak or the other will predominate. The amplitude ratio of the two signals will indicate the number of degrees off-course.

This is very useful when the pilot wishes to keep within a certain fixed angular direction with respect to such a beacon. He adjusts the amplitude of one signal so as to bring its peak at a given reference line and he can read from the height of the other signal the angle "off-course" on a calibrated screen.

Fig. 15 shows such an arrangement of a screen. Naturally, this pre-supposes the use of a series of such beacons, each sending radiations having similar patterns, in other words, the use of standardized and properly adjusted antenna structures.

I have found that it is essential to keep the difference of wavelengths between these signals as small as possible, so that the number of wavelengths traveled by each signal within 4–5 miles from the station—where the signals are generally more erratic and more subjected to the effects of reflection from obstacles—should be substantially equal, or differing only by one or two wavelengths. This reduces to practically zero the number of points where false indications would be obtained if this difference would be greater. This is a fundamental part of my invention distinguishing it from the usual type of dual frequency radio ranges, where no special precautions are taken to maintain this wavelength separation within a minimum value. The panoramic receiver can be made of sufficient selectivity to distinguish between two carriers of any frequency separation, as there are no interfering side-bands such as would be produced by modulating such carriers.

Two signals of very close frequency with their antenna elements quite close to each other are difficult, however, to maintain properly tuned. There is a tendency for these two signals to "pull" each other in synchronism or to create side-bands by becoming intermodulated.

By proper shielding precautions it is possible to run the two transmitters together.

I can avoid, however, completely these difficulties, by sending signals intermittently through each antenna, in such a manner that when one on, the other is off. This switching of the antennas, each operating on a predetermined different, and adjacent, frequency can be obtained either mechanically or electronically. The first method has the advantage of great simplicity.

Fig. 16 shows such an arrangement in which master oscillator 116 in the dotted rectangle as a frequency determined by inductance 117 formed by either condenser 118 alone or by condensers 118 and 119 in parallel. Condenser 119 may be either set to a definite frequency or controlled by a device 1. These two condensers are periodically connected in parallel by a rotary commutator 120—121, turned by a motor 122. One half, 120 of this commutator is constructed of metal and is grounded. The other half, 121 of the commutator is insulated. Rapid commutation is obtained of two frequencies $F_1$ and $F_2$, the difference between these frequencies being determined by the capacitance of condenser 119. Multiplying or buffer stages follow this master oscillator, and then a final amplifier 23 is provided. The output inductance 124 is connected to a commutator 125, 126 and 127, in such a manner as to be alternately connected at each half rotation of this commutator with either antenna $A_1$ or $A_2$.

The position of all these commutator rings and segments is carefully arranged so as to obtain an absolute synchronism between the frequency switching and antenna switching. A common shaft 128 is used to rotate all these commutator rings. This mechanical system has the common disadvantage of requiring periodical maintenance. For this reason, as well as others, described hereinafter, I prefer an electronically controlled dual-frequency, dual-directional system.

Fig. 17 shows in block diagram such a system. A master oscillator M periodically changes the frequency from $F_1$ to $F_2$ as controlled by a frequency determining circuit N which in turn is controlled by a periodic current, preferably a square-wave generator O. The master oscillator may be coupled to multiplying or buffer stages P, or be fed directly into two final amplifiers $T_1$ and $T_2$. These amplifiers are permanently connected to their respective antennas $A_1$ and $A_2$ but only one operates at a time, as the keying tubes $R_1$ and $R_2$ alternatingly cut them off or block their operation. These keying tubes are controlled by the same square-wave generator O which controls the frequency $F_1$ or $F_2$.

Fig. 18 shows the details of such a transmitter. The parts corresponding to the block diagram Fig. 17 are surrounded by dotted lines. Tube 129 is a square-wave oscillator similar to tube 80 of Fig. 6. A push-pull amplifier stage composed of tubes 130—131 follows it, the tube 131 acting as an amplifier phase inverting tube. Part of the square-wave voltage is applied through an amplitude controlling potentiometer 134 to the frequency controlling tube 132 which acts upon the oscillator tube 116 just like the tube 15 acted upon the tube 14 in Fig. 4. The frequency variation is determined by the adjustment of potentiometer 134. The amplified push-pull square-wave impulses are applied to the keying tubes 133A and 133B which respectively bias or block the final amplifying tubes 123A and 123B.

These tubes receive their excitation from the master oscillator 116, through the multiplying and buffer stages P, through a balanced grid line 135. The two antennas $A_1$ and $A_2$ are permanently connected but operate alternatingly and only one-half of the total time.

As only one power amplifier draws plate and grid current at any one time, the requirements of the power supply are those of a single ended transmitter. Furthermore, as each power amplifier has to dissipate current only during one-half of the time, the tubes used can be loaded up during the operation at much more than their ordinary continuous ratings, without harming them. The plate and grid meters 136A, 136B and 137A, 137B, are used for balancing the two amplifiers accurately.

Instead of using a master oscillator which is electronically controlled, and followed by various stages and power amplifiers, it is quite practical to use two simple self-oscillating transmitters which work continuously or are alternately keyed on and off, like the final amplifiers shown as 123A and 123B. This simplifies the construction very much. Such a double oscillator is represented in block diagram in Fig. 19 and can be visualized in details from Fig. 18 in which the stages M, N and P, the grid line 135, and neutralizing condensers 138A and 138B are simply shunted. By using parallel line plate and grid circuits of very high Q, and by not heavily loading these oscillators, their frequency stability is quite good and they make excellent simple direct "right" and "left" indicating radio range beacons. In the block diagram Fig. 19, I have also omitted the keying tubes because the oscillator grids can easily be controlled directly by the square-wave generator O which applies sufficient voltage to entirely shut off each oscillator alternatingly.

With reference to Fig. 18, this result would be obtained by connecting the two meters 137A and 137B, instead of to ground, to the cathode resistors 139 and 140 of the square-wave generator and replacing the tubes 133A and 133B by cathode biasing resistors.

In all these transmitter arrangements, the frequency can be either preset or can vary within certain limits as controlled by a frequency controlling element such as an aneroid barometer, as shown in Fig. 1. The two antennas, whose orientation determines certain courses, can either be fixed or of variable orientation and can be mounted either on a fixed body, or on a mobile body. For example, such simple dual-transmitters of predetermined frequencies preset at a given small difference, can be located at predetermined intervals along a navigational air line to determine a given line of flight. Such a line may extend in a curve course. By spacing such transmitters sufficiently near each other and by properly setting each antenna, the flier can be guided along the given path. With a panoramic receiver aboard, the pilot can see when the aircraft passes through the intersection of two such equi-signal courses.

Fig. 20 shows such a case where a series of such dual-frequency beacons $S_1$, $S_2$ and $S_3$, are so arranged as to lead a flier over a course $S_1$, $P_{1-2}$, $S_2$, $P_{2-3}$, $S_3$, in which $P_{1-2}$ and $P_{2-3}$ represent the surfaces determined by the intersections of the courses determined by $S_1$ and $S_2$, and $S_2$ and $S_3$, respectively. These intersections may be landing fields or other important points and it is important for some purposes to limit it to the smallest possible surface. It can be shown that the area P of such a surface is a function of the two distances $S_1-P$ and $S_2-P$ of the angle $\omega$ between the two courses and the angular opening $\alpha$ of each course. That is to say, the angular opening within which a flier can determine that the aircraft is on the desired course is approximately determined by the following formula:

$$P = \frac{S_1 P \times S_2 P \times \sin^2 \alpha}{\sin \omega}$$

It can be seen that this area varies proportionally to the square of the angle $\alpha$ and it is, therefore, important in such applications to use a very sensitive arrangement which shows at once when the aircraft is off-course. The use of the threshold control on the panoramic receiver, as explained hereinbefore, now becomes very important as it emphasizes small differences of amplitude between signals. Square-law detectors may also be used, instead of linear-detectors, for further emphasizing such differences.

Such an airline may use a series of such dual-frequency beacons whose average frequency (average between the two frequencies used) varies proportionatelly to the variation of distance of their location with respect to a fixed reference. This reference can be a line (a given meridian or parallel), or a point. In other words, let us say that the frequency band $F_{max.}$ to $F_{min.}$ is used to cover a distance of D miles extending between two such fixed references. Each dual transmitter uses two frequencies $f_x$ and $f'_x$ determined by a distance of $x$ miles from one such reference. The average frequency $F_x$ equals $$\frac{f_x + f'_x}{2} = \frac{x(F_{max.} - F_{min.})}{D} + F_{min.}$$

A panoramic receiver on board of the plane covering such a route can be calibrated in miles and the flier can at all times see a plurality of such beacons along his course.

In order to extend the number of stations which can be used along the distance D, and not to crowd them too much on the screen of a cathode ray tube of relatively small diameter, I prefer to combine some manual tuning with panoramic tuning and, at the same time, use an indicator showing what part of the band is tuned in, this indicator being calibrated in units of distance.

Such an arrangement is shown in Fig. 21 in which 141 is the screen of a cathode ray tube and 142 is a slider which can move to right or left within certain limits by the action of idler pulleys 143, 144 and manually controlled pulley 145, over which a steel string 146 is wound. This string is connected to the two ends of the slider 142.

This slider can move so that either end of it can come in line with one extremity of the screen of the cathode ray tube. It is calibrated in miles, and their separation corresponds to the separtion between signals appearing on the cathode ray tube screen; for example, as shown in Fig. 21, when all the way to the right it will show the stations from the reference point (zero miles) up to 200 miles and when all the way to the left it will show the stations from 200 miles up to 400 miles. This is obtained by connecting the same pulley 145 with the shaft 147 of a rotor of a condenser 113 (see Figs. 11 and 13) or condenser 11 (Figs. 4 and 9). A frame in this slider permits insertion of a card 148 showing in their spacial relationship a series of beacon stations, for example from Chicago to Erie. Each beacon station may determine either a two-course or a four-course route, according to the type of aerials they use. A flier starting from Chicago will set condenser 113 fully in, for lowest frequency ($F_{min.}$) and the slider will, by this motion, move to its extreme right position, and the beginning of the dial on the left corresponding to distance zero, indicating Chicago, will correspond to $F_{min.}$ on the screen. The dual frequency beacons will appear one after the other, further to the right, as the flier progresses along the course, several being seen according to the height or distance of the flier. The observer can, if he wishes to, gradually bring them to the center and maintain the true relationship between the readings on the card 148, mileage indication on slider 142 and position of the signal on screen 141. Such an arrangement as shown is the equivalent of multiplying the diameter of the screen by two, and, naturally this can be multiplied still more if desired. As the flier reaches the end of the course marked on the card, he enters a new zone where the frequencies $F_{min.}$—$F_{max.}$ are repeated and he replaces the card 148 with a new one, resetting his dial to zero miles. Such a receiver, by reducing the sweep voltage applied through potentiometer 26 to the reactance tube, becomes an ordinary receiver tuned at the "center frequncy" defined hereinabove. The auditive device 34 will then reproduce the audible signals of any station corresponding to that center frequency and which can be marked as a hairline on the center of the oscillograph screen (Fig. 21).

This dial arrangement can very well be used with a two-band panoramic receiver such as shown in Figs. 5, 6, 7, 11, 13, in which one band is controlled by one manual setting such as just described (condenser 113), and the other band by an automatic setting (condenser 11) determined, for example, by an altimeter.

In Fig. 21, I show such a combination dial. Above the screen 141, a scale 148' of the diameter of the screen shows 0 in its center and is calibrated in altitudes up to 2000 feet above to the right and 2000 feet below to the left of the center line. An altimeter dial 149 gives the actual altitude which in Fig. 21 is 5200 feet.

A signal 150 appears on the screen, above the line of beacon signals, indicating the preesnce of a warning station about 1000 feet above the observer, in other words, at 6200 feet. This may be a mountain peak or another plane, and this matter is easily determined, as it will be explained hereinafter, according to the rate of "blinking" or interruption of the signal.

In the first case, the pilot knows that he must rise until the signal passes to the left of the center line, that is, below him.

In the second case, certain traffic regulations are applied and as each pilot either goes higher or lower, their respective change of position is seen by the two observers in their receivers.

The identification of stations can be obtained in various manners with a panoramic receiver, and in ways impossible to be obtained with ordinary receivers.

One of the means which can be used is the rate of interruption of a signal. From the foregoing explanations, it resulted that either the dual-frequency beacons, or the collision warning signals sent by planes are periodically interrupted signals. This rate of interruption corresponds to a modulation which can be determined easily provided that the frequency of the sweep of the panoramic receiver is adjustable. This can be obtained very readily with the electronically controled sweeps shown and I have provided the necessary controls for this purpose (see 84—87, Fig. 4). In a mechanically controlled receiver, continuously adjustable speed devices must be used for this purpose, either by varying the speed of the motor itself or of the devices connecting the motor to the receiver.

By synchronizing the frequency of the sweep with the frequency of modulation of a signal, I can receive that signal as if it was of unchanging nature because every time the receiver sweeps through the frequency of the signal, the signal is picked up at the same amplitude. If such a signal is interrupted periodically, a perfect synchronism could cause it to be absent in the panoramic receiver, entirely. This can happen in case of the collision signals sent by planes, which could be synchronized by chance with a receiver, so that they would not be received. This, however, would require a combination of coincidental factors, rarely met in practice: the two receivers in two different planes would have to be swept in absolute synchronism and be tuned to the same frequency continuously. The chance of this condition occurring is remote and is further reduced by reducing the total interruption time of the collision warning transmitter to the shortest possible limit.

This synchronizing, however, can be made very useful, for example for identifying a multiplicity of beacon stations of different frequencies, but each along a given air route, or for differentiating between beacons of different zones or different routes, or for characterizing certain fixed warning beacons.

All these dual-frequency beacons forming part of a common system can be alternately keyed on and off at one and the same frequency rate, determined by properly adjusting the frequency of the square-wave keying current. The observer can also adjust the sweep frequency of his receiver so as to see, for example, a very slow change of one frequency to another, or he may stop (momentarily and during the identification test) the signal on one frequency only.

By noting the position of the sweep frequency controls at which this occurs, the pilot can distinguish one set of signals from another set. One set of beacons may have for example an on-off rate of 27 cycles per second, another one of 32 per second, and the different settings he would require on his receiver to "freeze" one set of motions will tell him which set he is considering. This synchronizing is also useful for eliminating certain forms of recurrent noises, such as from motors or vibrators. The sweep frequency of the receiver can be adjusted in synchronism with the source of noise, whereby such noise signals become "frozen" in a fixed part of the screen.

The duel beacons, therefore, give characteristic signals which generally appear as two V-like deflections, partly superimposed, if desired, these signals closing at the bottom. They cannot be mistaken with ordinary unmodulated signals which are open at the bottom.

The frequency differences of such dual beacons should be very small indeed in order to minimize to a negligible point the difference of propagation characteristics between the two frequencies. This difference can also, either be fixed or can vary so as to give another indication of value as it will be shown hereinafter.

The two-course beacons are to be preferred to four-course beacons because they can be made to give a positive indication of "right" and "left."

In Fig. 22, I show a course $X_1$—$X_2$ determined by such a dual-frequency beacon located at O and alternately emitting on each side of the course signals L and R on adjacent frequencies $F_L$ and $F_R$. Suppose that frequency $F_L$ is higher than that of $F_R$, and a plane carrying a panoramic receiver flies in the direction of the arrow from $X_1$ to $X_2$. If the screen of this receiver is so disposed that higher frequencies are to the left, if the plane happens to be on the left side of the line $X_1$ $X_2$, for example, in points $Y_1$ or $Y_2$, the left hand signal becomes taller than the right hand signal (see Fig. 22a) and vice-versa, if it happens to be on the right side $Y_3$ or $Y_4$, the right hand signal becomes taller than the left hand signal (se Fig. 22b).

This is directly interpreted indication, provided that the observer knows his direction with respect to the station.

In a multiplicity of stations, near each other, this is relatively simple because he generally receives at least two adjacent stations simultaneously and from their variation of amplitude can tell, within a few minutes, which of the two he is approaching. It is possible to distinguish the two signals of each station, independently of their respective frequency, in fact, even by making these signals of identical frequency, by keying the two transmitters L and R at two different rates. In other words, for example, I can make L operate for periods of time three to five times as long as R. In the panoramic receiver L will appear brighter and steadier than R. If, by convention, all stations transmitting a course in the general direction east-west, key the signals directed north longer than the signals directed south, a flier situated on the northern side of the course $X_1$—$X_2$, will see the brighter signal higher in amplitude than the dull one, and a flier situated on the southern side of that same course will see the brighter signal lower in amplitude than the dull one. These two conditions are represented in Figs. 22a and 22b, in which the bright signals are represented in heavy lines and the dull signal in dotted lines.

In these figures, the signals are shown as of different frequencies, being understood, however, that the same frequency can be used for each. The directional interpretations from a dual-frequency beacon are different for a flier going in one direction and for one going in a reverse direction. For the first flier a taller left hand signal is interpreted as indicating that the plane is bearing too much to the left and for the other one a taller left hand signal is interpreted as indicating that the plane is bearing too much to the right. The flier can, however, easily become accustomed to such indications, which are natural as one reverses his direction, but even this can be remedied by either reversing the connections to one set of deflcting plates, so as to make the indications appear upside down in one direction, or by rotating the tube 180° around its axis.

The unequal keying time can be otbained electronically by simply adjusting to one side the time equalizing potentiometer 156 (Fig. 18) or mechanically by making unequal the angular openings of the sectors of commutators 120—121, 126, 127, (Fig. 16).

Beacons giving, in combination, a number of simultaneous indications can thus be made. As an example, I shall describe one which simultaneously indicates: altitude of a point, barometric correction, wind direction and velocity. This is simply a combination of the principles described above. The beacon is a dual-frequency two-course radio range transmitter, one frequency of which being fixed and predetermined by its altitude, the other frequency swinging above or below that frequency and being determined by a barometer controlled oscillator. The two are unequally keyed in time, as explained above, the fixed frequency lasting about three times longer than the variable one. These two frequencies permit the flier to make the necessary correction on his altimeter, in case he wishes to make a landing there.

The antennas of these two transmitters are determining a course similar to $X_1$—$X_2$ of Fig. 22, but this course is orientable according to the wind direction, by pivoting the antenna array around a central point. Fig. 23 shows in simplified form an upper view of such an antenna array in which 151, 152 are the vertical antennas, each connected to one transmitter. Each antenna acts as a reflector for the other when one works, obtaining as a result, two patterns opposed in phase, shown diagrammatically as 153 and 154. The array is rotated by a wind vane 155, in such a way that a given antenna is always on the same side with respect to the wind direction, for example, the brighter signal, corresponding to the fixed altitude can be made to always be on the left side (151) of the wind, whose direction is represented by an arrow in Fig. 23. A flier flies in the direction of the wind when approaching or receding from such a station if the brighter of the two signals (indicating constant altitude) becomes taller as he goes slightly off course to the left, or flies into the wind for the reverse condition. The wind velocity can be indicated by the rate of switching of the dual-frequency beacon. Any kind of velocity higher than a certain given one causes this keying speed to be changed. This can be done by using an anemometer which rotates a small direct current generator, whose potential is used either for speeding up the motor 122 of Fig. 16, or for changing the electronic keying rate of the transmitter by applying its potential to the grid return of the square-wave tube 129 (Fig. 18) at point 157. This keying speed can be determined by the observer who can translate it directly into wind velocity.

A beacon such as just described may be used in an emergency unattended landing field, where a pilot can make a landing even if no personnel is there to assist him. His collision warning receiver will indicate if the field is clear and no other planes are there, or if there are, would indicate which plane is lower and which would have the priority to make a landing. His altimeter can be corrected and he will know when he flies against the wind. It is possible to combine such a beacon with a complete instrument landing system, by using the wind direction indicating beacon as a runway indicator, provided that this beacon is installed in the center of the field and does not obstruct landings. A glide path indicating dual-frequency beacon can be established by emitting two signals according to transmission patterns which differ in the vertical projection. Fig. 30 shows such a dual frequency glide path resulting from the combination of two vertical patterns, one emitted on frequency F and the other on frequency F' quite adjacent to each other. They are produced by two transmitters, each radiating its power from an antenna of different height above the ground. The lower of the two will give the pattern shown as F, of very low angle, with a definite cone of silence above it. The other antenna, slightly higher, will give a pattern having main lobes of higher angle, as well as some other lobes in the cone of silence of the first signal. An equipotential surface having the shape of a cone is produced, its apex being in the point O where the antennas are situated. The lines $OZ_1$ and $OZ_2$ represent two possible glide paths resulting by the intersection of this cone with the vertical plane determined by the runway indicator.

The direction of the runway indicator is determined by the wind direction, but a glide path is always indicated for any wind direction. The center lobes of the signal F' serve for localizing the exact position of the landing beacon, then further facilitating its location in conditions of zero visibility. The flier will follow a substantially straight glide path by maintaining the signals from F and F' equal on the panoramic receiver. If the signal corresponding to F is higher, it means that he is too low and vice-versa; if F' is higher, he is too high.

A course determining a dual-frequency beacon can, as said above, be mounted on a mobile body such as a ship, which may be an airplane carrier, or the like, for determining a given direction, either for other ships or planes. Several ships can keep up in formation by interlinking such courses, for example, as seen in Fig. 24, where ships 158, 159, 160, and 161 are carrying four-course dual-range beacons. Airships may keep in formation flight by keeping at different altitudes as indicated by the apparatus described. What can be accomplished with dual-frequency beacons for indicating direction, may also be obtained very well with single frequency, non-directional transmitters but with dual-directional panoramic compasses.

In my copending application supra, such compasses have been shown but I shall show here a fuly electronically controlled compass to clarify the application of the various types of panoramic receivers which can be made to the system of my invention. Fig. 25 shows such a receiver in block diagram form.

Two radio frequency amplifying tubes are connected to two directional antennas at right angles to each other; these are represented as input circuits A and A'. The grid returns of these tubes are alternately keyed off by a square-wave generator S. The two inputs are brought to mixer C together with a signal from oscillator B. The latter is frequency modulated over a given frequency band by means of frequency modulating element F which in turn is controlled by the saw-tooth oscillator G operating at exactly double the frequency of the square wave as explained in connection to Fig. 7. This latter is synchronized in step with the square-wave oscillator S. The mixer alternately receives signals from input A or input A' and its output is amplified by the intermediate frequency stages following it and then detected at D. The properly amplified detected signals are fed into one deflecting plate of cathode ray tube H. The other deflecting plate at right angles, receives current from both the saw-tooth oscillator and the square-wave generator. The result is two series of images, on one and the same axis of the cathode ray tube but slightly displaced in relation to each other. This displacement is a function of the amplitude of the square-wave current which is fed to the deflecting plate. Each set of images corresponds to a separate input; for example, all the images at the left correspond to those received by one input, let us say A, and the other set, to the right, corresponds to the signals received by the other input A'. Fig. 26 shows a screen with three such images. Their amplitudes correspond to those fed by the two inputs A and A' If their amplifying factors are properly balanced, their amplitudes correspond to the position of the station with respect to the orientation of the two antennas A signal received from the plane bisecting the plane of the two antennas will be received equally well by the two channels A and A', consequently they will appear of equal height, 164. A signal better received by one or the other channel will appear with one peak predominating 162—163. The ratio between the two peaks indicates the angle of the station with respect to the receiving antennas. Fig. 27 shows a diagram of these elements. Some of the numbers used are common to Figs. 4 and 6, showing common elements. A number of the cathode ray tube elements, stabilizing resistors and other elements common to Fig. 4 have been omitted in Fig. 27. The tubes 12 and 12' are the two input tubes A and A' with two directional antennas at right angles. These tubes have a sharp cut-off and their cathodes are using the common resistors 166 and 167 with tube 165 which is a push-pull square-wave amplifier for square-wave oscillator 80. The saw-tooth generator 16 is synchronized to this square-wave generator through its grid. It supplies adjustable sweep voltage to deflecting plate 63 through potentiometer 169 or, if required, through an amplifier. It also supplies frequency modulating voltage to tube 15 through potentiometer 26. This tube is coupled as shown before to an oscillator 14 which is frequency modulated in synchronism with the sweep. The displacement of the two sets of images is obtained by feeding a square-wave voltage also to deflecting plate 63 which voltage is adjustable through potentiometer 168. In lieu of electronic control, I may employ mechanical control by the use of rotary commutators as shown in Figs. 9, 11, 13 and 16.

There is also some advantage in unbalancing the time for operating each channel in the ratio of 2:1 or more. In this case, one set of images will appear brighter than the other and will serve to eliminate the necessity of shifting the images along the axis, as explained in connection with dual frequency beacons. Ultra-high frequency compasses, using the direct wave or the ground wave, are quite practicable and as aerials simple horizontal dipoles are very convenient. The transmitter can use an antenna array giving a non-directional signal and the receiver uses these two crossed dipoles.

Cardioid pattern reception diagrams, instead of figure-eight patterns, can be obtained by using the arrangement described in Fig. 28, in which 8N represents a non-directional antenna which may be, for example, on ultra-short waves, a tuned horizontal one turn loop, if horizontally polarized waves are to be received; 8D represents in this case a horizontal dipole, having a figure-eight directivity pattern.

One of these antennas, in my example 8D, feeds into a push-pull circuit connecting the input tubes 12 and 12' which are alternately keyed off similar to the operation in Fig. 27. The signals are, consequently, reversed in phase as they pass through either one or the other of these tubes. The other antenna is fed to another radio frequency amplifying tube 12'' which operates continuously. The signals from these two antennas are fed into tube 13 and the balance of the receiver is similar to the one shown in Fig. 27. Signals from one antenna are alternately reversed in phase while those from the other are maintained in the same phase. By proportioning or balancing the amplification obtained in the two channels 12—12' one one hand and 12'' on the other, reversible cardioid pattern reception is obtained. A flier can maintain a straight course between two such non-directional beacons by maintaining equal the two peaks of each double signal on the cathode ray tube screen.

Although I have mentioned an altimeter or an aneroid barometer as the controlling device in the system of my invention, I desire that it be understood that other instruments may be used to serve similarly and to impart a certain knowledge; for example, a tachometer or speedometer may be employed to indicate speed or velocity, a thermometer to indicate temperature, etc. Therefore, in some of my claims I have used the expression "an independent controlling device" to signify any such device, which operates independently of the radio receiving system, but which controls the operation of the latter.

In the methods I described, I have shown only specific examples for obtaining certain results, but, it will be understood that I can obtain similar results by many other combinations of the elements described for shifting frequencies, keying on and off oscillators, periodically selecting one between a plurality of circuits, etc.

While I have described my invention in certain preferred embodiments, I desire that it be understood that modifications may be made and that no limitations upon my invention are intended other than may be imposed by the scope of the appended claims.

What I claim as new and desire to secure by Letters Patent of the United States is as follows:

1. A wind direction and velocity indicating radio beacon comprising a radio transmitting system of radio frequency energy and a variable frequency modulator, a wind driven propeller rotating at a rate corresponding to the wind velocity, means for controlling the frequency of the said modulator in step with said rate of rotation, connections between the said modulator and the said radio transmitting system, a directionally radiating antenna connected to said transmitting system, means for producing a directional indication along a fixed direction with respect to said antenna, and wind responsive means including a wind vane for rotating said antenna according to the wind direction for orienting said directional indication in the direction of the wind.

2. In an instrument landing system, a dual frequency glide path indicating radio beacon and a field localized beacon, each of said beacons comprising a radio transmitting system of radio frequency energy having means for generating two non-modulated signals on closely adjacent frequencies, the said glide path indicating beacon including means for radiating each of said signals at different vertical angles, said signals producing an equi-potential plane at an angle with respect to a horizontal plane; and the said field localizer beacon including means for radiating its two signals at different azimuthal directions and producing an equi-potential azimuthal plane in the direction of a landing path, and a signal receiving system carried on board an aircraft, said receiving system including an oscillograph and a screen, and means for simultaneously producing on the said screen a visual image characteristic of the signal strength relationship of each of the said two signals from each of the said two beacons.

3. A dual frequency radio navigational system, including a high frequency signal generating system and an antenna system, means for periodically changing the carrier frequency of said transmitting system from one frequency to another frequency, said frequencies being fixed and predetermined and means synchronized with the first said means for changing the directivity of said antenna system, each of said carrier frequencies being transmitted in a predetermined direction and at a fixed angle with respect to the other; and a radio receiving system including an oscillograph and a screen, and means for picturing on said screen a visual image characteristic of the signal strength relationship of the said two signals.

4. A navigational system including, in combination, a dual-frequency radio beacon comprising two radio frequency generating systems operating on different but adjacent and fixed frequencies, each of said systems being connected to a radiating system having different directional characteristics, keying means connected to each of said systems and means for alternately operating each of said keying means at a predetermined rate; and a radio receiving system including a cathode ray oscillograph, means for producing on said oscillograph visual images characteristic of the signal strength relationship of the said two radiating systems at any given point, and means for determining the rate of the said keying means.

5. A navigational system including a dual-frequency radio beacon comprising two radio frequency generating systems operating on different but adjacent and fixed frequencies, each of said systems being connected to a radiating system having different directional characteristics, keying means connected to each of said systems and electronic means including a periodic pulse generator for operating each of said keying means at a predetermined rate; and a radio receiver having visual means including an oscillograph and a screen, for substantially simultaneously indicating the signal strength relationship of the said fixed frequencies.

6. A dual-frequency radio beacon comprising two radio frequency generating systems operating on different but adjacent and fixed frequencies, each of said systems being connected to a radiating system having different directional characteristics, electric impulse operated keying means connected to each of said systems, a generator of periodical electric impulses and means to alternately apply said impulses to each of said keying means for alternately interrupting the operation of each of said systems.

7. A directional dual-frequency radio range beacon including a master oscillator coupled to two amplifiers and two radiating systems whose directivity patterns are oriented at a fixed angle with respect to each other, connections between each of said amplifiers and said radiating systems, electronically operated switching means for periodically and alternately keying said amplifiers and means operating in synchronism with first said means for periodically changing the frequency of said oscillator.

8. A navigational system including a plurality of direction indicating radio transmitting beacons situated in different geographic locations, each of said beacons including two transmitting systems on non-modulated radio frequency energy, the first said systems being connected to a first directional radiating system and operating on a first fixed frequency channel, the second said transmitting system being connected to a second directional radiating system and operating on a second fixed frequency channel, said radiating systems being oriented so as to create along a predetermined line, characteristic for each beacon, signals of equal field strengths from each of said transmitting systems; and a signal receiving system having input and output circuits, a signal collector connected to said input circuit and a cathode ray oscillograph tube having a cathode ray beam generator and a screen connected to said output circuit, means for substantially simultaneously creating on the screen of said oscillograph a plurality of sets of individual deflections corresponding to a plurality of said beacons, each set comprising two deflections corresponding to the first and second of said transmitting systems of each beacon, the amplitude of said deflections being characteristic of the field strength level of each signal, said signals appearing of equal amplitude when received along said predetermined line of any of said beacons.

9. A navigational system including a direction indicating radio beacon and a receiving system, said beacon including a transmitting system of radio frequency energy of characteristic frequency and two directional radiating systems oriented at an angle to each other, a commutator operating periodically and at a characteristic rate, means including said commutator, for periodically connecting each of said radiating systems to said transmitting system during unequal periods of time; and a signal receiving system including a signal receiving circuit and a cathode ray tube having a screen and deflecting elements, means for periodically tuning the said signal receiving system over a predetermined frequency bandwidth, means for impressing on said deflecting elements the signals received over the said bandwidth, originating from the said beacon and producing on said screen visual signals of an amplitude characteristic of the field strength of each of the signals received and of brightness corresponding to the period of duration of each signal.

10. A radio direction indicating system including a dual frequency range beacon having means for emitting signals on two closely adjacent frequencies, means for radiating each of the said signals at an angle to the other; and a signal receiving system including electronically controlled means for periodically tuning said receiving system over a predetermined frequency bandwidth, an oscillograph and a screen and means for producing on said screen a visual image characteristic of the signal strength relationship of the said two signals from the said beacon.

11. A radio direction indicating system as set forth in claim 10, comprising a plurality of said dual frequency beacons, wherein the two frequencies of each beacon are characteristic of one single beacon and wherein the said last means produce substantially simultaneously a plurality of visual images on said screen, corresponding to a plurality of said beacons.

MARCEL WALLACE.